US 008200687B2

(12) United States Patent
Gupta

(10) Patent No.: US 8,200,687 B2
(45) Date of Patent: Jun. 12, 2012

(54) SYSTEM TO GENERATE RELATED SEARCH QUERIES

(75) Inventor: Raghav Gupta, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 11/323,486

(22) Filed: Dec. 30, 2005

(65) Prior Publication Data

US 2006/0288000 A1  Dec. 21, 2006

Related U.S. Application Data

(60) Provisional application No. 60/692,125, filed on Jun. 20, 2005.

(51) Int. Cl.
 *G06F 7/00* (2006.01)
(52) U.S. Cl. ......... 707/767; 707/737; 707/741; 707/769
(58) Field of Classification Search .................... None
 See application file for complete search history.

(56) References Cited

U.S. PATENT DOCUMENTS

| 4,996,642 | A | 2/1991 | Hey |
| 5,310,997 | A | 5/1994 | Roach et al. |
| 5,583,763 | A | 12/1996 | Atcheson et al. |
| 5,749,081 | A | 5/1998 | Whiteis |
| 5,790,790 | A | 8/1998 | Smith et al. |
| 5,825,881 | A | 10/1998 | Colvin, Sr. |
| 5,842,199 | A | 11/1998 | Miller et al. |
| 5,845,265 | A | 12/1998 | Woolston |
| 5,897,622 | A | 4/1999 | Blinn et al. |
| 6,006,225 | A * | 12/1999 | Bowman et al. ............. 1/1 |
| 6,016,475 | A | 1/2000 | Miller et al. |
| 6,047,264 | A | 4/2000 | Fisher et al. |
| 6,049,777 | A | 4/2000 | Sheena et al. |
| 6,055,513 | A | 4/2000 | Katz et al. |
| 6,061,448 | A | 5/2000 | Smith et al. |
| 6,085,176 | A | 7/2000 | Woolston |
| 6,101,484 | A | 8/2000 | Halbert et al. |
| 6,108,493 | A | 8/2000 | Miller et al. |

(Continued)

FOREIGN PATENT DOCUMENTS

EP   0957437 A2   11/1999

(Continued)

OTHER PUBLICATIONS

"U.S. Appl. No. 10/689,970 Final Office Action mailed Jan. 25, 2007", 18 pgs.

(Continued)

*Primary Examiner* — Pierre Vital
*Assistant Examiner* — Mohammad S Rostami
(74) *Attorney, Agent, or Firm* — Schwegman, Lundberg & Woessner, P.A.

(57) ABSTRACT

System and methods are described to provide new recommendations to a search interface to assist users in navigating toward new searches that are likely to generate results aligned with the user's searching intentions. An algorithm analyzes previous search sessions to determine additional locations for the user to go. In an example of a commerce system, new information placement may be added to the top of search and listings pages to show links to new searches that can be run by the user. On a periodic basis, the search recommendations may be updated, for example based on the most current changes in user behavior.

21 Claims, 16 Drawing Sheets

U.S. PATENT DOCUMENTS

| | | | |
|---|---|---|---|
| 6,119,101 A | 9/2000 | Peckover | |
| 6,119,137 A | 9/2000 | Smith et al. | |
| 6,169,986 B1 | 1/2001 | Bowman et al. | |
| 6,178,408 B1 | 1/2001 | Copple et al. | |
| 6,192,407 B1 | 2/2001 | Smith et al. | |
| 6,195,657 B1 | 2/2001 | Rucker et al. | |
| 6,202,051 B1 | 3/2001 | Woolston | |
| 6,243,691 B1 | 6/2001 | Fisher et al. | |
| 6,266,649 B1 | 7/2001 | Linden et al. | |
| 6,308,168 B1 | 10/2001 | Dovich et al. | |
| 6,313,745 B1 | 11/2001 | Suzuki | |
| 6,321,221 B1 | 11/2001 | Bieganski | |
| 6,334,127 B1 | 12/2001 | Bieganski et al. | |
| 6,356,879 B2 | 3/2002 | Aggarwal et al. | |
| 6,370,513 B1 | 4/2002 | Kolawa et al. | |
| 6,412,012 B1 | 6/2002 | Bieganski et al. | |
| 6,430,558 B1* | 8/2002 | Delano | 707/5 |
| 6,466,918 B1 | 10/2002 | Spiegel et al. | |
| 6,487,539 B1 | 11/2002 | Aggarwal et al. | |
| 6,499,029 B1 | 12/2002 | Kurapati et al. | |
| 6,671,681 B1* | 12/2003 | Emens et al. | 707/5 |
| 6,701,309 B1* | 3/2004 | Beeferman et al. | 707/3 |
| 6,704,727 B1 | 3/2004 | Kravets | |
| 6,732,088 B1* | 5/2004 | Glance | 707/3 |
| 6,772,150 B1* | 8/2004 | Whitman et al. | 707/6 |
| 6,782,370 B1 | 8/2004 | Stack | |
| 6,859,807 B1 | 2/2005 | Knight et al. | |
| 6,963,850 B1 | 11/2005 | Bezos et al. | |
| 7,092,936 B1* | 8/2006 | Alonso et al. | 707/3 |
| 7,225,182 B2 | 5/2007 | Paine et al. | |
| 7,831,476 B2 | 11/2010 | Foster et al. | |
| 8,051,040 B2 | 11/2011 | Johnson et al. | |
| 2001/0021914 A1 | 9/2001 | Jacobi et al. | |
| 2001/0037255 A1 | 11/2001 | Tambay et al. | |
| 2001/0056395 A1 | 12/2001 | Khan | |
| 2002/0016786 A1 | 2/2002 | Pitkow et al. | |
| 2002/0019763 A1 | 2/2002 | Linden et al. | |
| 2002/0059116 A1 | 5/2002 | Bulatovic et al. | |
| 2002/0065802 A1 | 5/2002 | Uchiyama | |
| 2002/0082901 A1 | 6/2002 | Dunning et al. | |
| 2002/0103789 A1* | 8/2002 | Turnbull et al. | 707/3 |
| 2002/0107853 A1 | 8/2002 | Hofmann et al. | |
| 2002/0143660 A1 | 10/2002 | Himmel et al. | |
| 2002/0147724 A1* | 10/2002 | Fries et al. | 707/100 |
| 2002/0156686 A1 | 10/2002 | Kraft et al. | |
| 2002/0184116 A1 | 12/2002 | Tam et al. | |
| 2002/0198882 A1* | 12/2002 | Linden et al. | 707/10 |
| 2003/0037050 A1 | 2/2003 | Monteverde | |
| 2003/0050863 A1 | 3/2003 | Radwin | |
| 2003/0055831 A1 | 3/2003 | Ryan et al. | |
| 2003/0093331 A1 | 5/2003 | Childs et al. | |
| 2003/0130994 A1 | 7/2003 | Singh et al. | |
| 2003/0229537 A1 | 12/2003 | Dunning et al. | |
| 2004/0034652 A1 | 2/2004 | Hofmann et al. | |
| 2004/0103092 A1* | 5/2004 | Tuzhilin et al. | 707/3 |
| 2004/0128321 A1 | 7/2004 | Hamer | |
| 2004/0153463 A1 | 8/2004 | Sasai et al. | |
| 2004/0193612 A1 | 9/2004 | Chang | |
| 2004/0205558 A1 | 10/2004 | Holloway et al. | |
| 2004/0236736 A1* | 11/2004 | Whitman et al. | 707/3 |
| 2004/0260621 A1 | 12/2004 | Foster et al. | |
| 2005/0076003 A1* | 4/2005 | DuBose et al. | 707/1 |
| 2005/0091209 A1 | 4/2005 | Frank et al. | |
| 2005/0102259 A1 | 5/2005 | Kapur | |
| 2005/0102282 A1 | 5/2005 | Linden | |
| 2005/0125240 A9 | 6/2005 | Speiser et al. | |
| 2005/0125392 A1* | 6/2005 | Curtis et al. | 707/3 |
| 2005/0144086 A1 | 6/2005 | Speiser et al. | |
| 2005/0198068 A1* | 9/2005 | Mukherjee et al. | 707/104.1 |
| 2006/0053096 A1* | 3/2006 | Subramanian et al. | 707/3 |
| 2006/0080292 A1* | 4/2006 | Alanzi | 707/3 |
| 2006/0085391 A1* | 4/2006 | Turski et al. | 707/3 |
| 2006/0106769 A1* | 5/2006 | Gibbs | 707/3 |
| 2006/0129533 A1* | 6/2006 | Purvis | 707/3 |
| 2006/0161520 A1* | 7/2006 | Brewer et al. | 707/3 |
| 2006/0167857 A1* | 7/2006 | Kraft et al. | 707/3 |
| 2006/0195442 A1* | 8/2006 | Cone et al. | 707/5 |
| 2006/0206475 A1* | 9/2006 | Naam et al. | 707/5 |
| 2006/0212447 A1 | 9/2006 | Davis et al. | |
| 2006/0224554 A1* | 10/2006 | Bailey et al. | 707/1 |
| 2006/0224587 A1* | 10/2006 | Zamir et al. | 707/7 |
| 2006/0230005 A1* | 10/2006 | Bailey et al. | 706/12 |
| 2006/0248078 A1* | 11/2006 | Gross et al. | 707/5 |
| 2006/0253458 A1* | 11/2006 | Dixon et al. | 707/10 |
| 2006/0271524 A1* | 11/2006 | Tanne et al. | 707/3 |
| 2007/0118802 A1 | 5/2007 | Gerace et al. | |
| 2008/0077574 A1 | 3/2008 | Gross | |
| 2008/0147661 A1 | 6/2008 | Carden | |
| 2008/0306938 A1 | 12/2008 | Johnson et al. | |
| 2010/0325011 A1 | 12/2010 | Foster et al. | |
| 2011/0055040 A1 | 3/2011 | Foster et al. | |
| 2012/0016893 A1 | 1/2012 | Johnson et al. | |

FOREIGN PATENT DOCUMENTS

| | | |
|---|---|---|
| JP | 2002092032 | 12/1990 |
| JP | 2005032193 | 9/1996 |
| JP | 09244945 | 9/1997 |
| JP | 11250086 | 9/1999 |
| JP | 11250086 A | 9/1999 |
| JP | 2002123544 | 4/2002 |
| JP | 2002215659 | 8/2002 |
| JP | 2004502213 | 1/2004 |
| JP | 2005063277 A | 3/2005 |
| WO | WO-0017792 A1 | 3/2000 |
| WO | WO-0017793 A1 | 3/2000 |
| WO | WO-0045319 A1 | 8/2000 |
| WO | WO-0116848 A2 | 3/2001 |
| WO | WO-0129726 A2 | 4/2001 |
| WO | WO-0131537 A2 | 5/2001 |
| WO | WO-0133401 A2 | 5/2001 |
| WO | WO-0219203 A2 | 3/2002 |
| WO | WO-0229695 A1 | 4/2002 |
| WO | WO-0237926 A2 | 5/2002 |
| WO | WO-2004114155 A1 | 12/2004 |
| WO | WO-2007001980 A2 | 1/2007 |
| WO | WO-2007001980 A3 | 1/2007 |

OTHER PUBLICATIONS

"U.S. Appl. No. 10/689,970 Non Final Office Action mailed Jun. 13, 2006", 14 pgs.

"U.S. Appl. No. 10/689,970 Response filed Oct. 13, 2006 to Non Final Office Action mailed Jun. 13, 2006", 11 pgs.

Andale Gallery, "Andale", www.andale.com/corp/products/gallery.jsp, (Printed May 21, 2002).

Andale Gallery, "Gallery—Cross Sell More Items", http://cms.andale.com/corp/products/gallery.jsp (also http://cms.andale.com/auction/gallery.html), Accessed on Web Apr. 15, 2005, (Copyright 1999-2005), Web Page.

Andale Gallery, "Prominently Featured on Your Listings", http://www.andale.com/corp/tour/gal_tour4.html, Accessed on Web—Apr. 15, 2005, (Copyright 2001), Web Page.

Ansari, A., "Internet Recommendation System", *Journal of Marketing Research*, vol. 37(3), Proquest #57914570, (Aug. 2000), 363.

Ardissono, Liliana, et al., "Tailoring the Interaction With Users in Electronic Shops", *Proceedings of the Seventh International Conference on User Modeling*, Banff, Canada, (1999), 35-44.

Balabanovic, Marko, "An Adaptive Web Page Recommendation Service" *Stanford University Digital Libraries Project Working Paper*, Proceedings of the First International Conference on Autonomous Agents, (1999), 378-385.

Breese, John S, et al., "Empirical Analysis of Predictive Algorithms for Collaborative Filtering", *Technical Report MSR-TR-98-12—Microsoft Research*, (May 1998—Revised Oct. 1998), 1-21.

Burke, Robin, "The Wasabi Personal Shopper: a case-based recommender system", *Proceedings of the Sixteenth National Conference on Artificial Intelligence and the Eleventh Innovative Applications of Artificial Intelligence Conference Innovative Applications of Artificial Intelligence*, (1999), 844-849.

Changchien, S, "Mining association rules procedure to support online recommendation by customers and product fragmentation", *Expert Systems with Application*, 20(4), (May 2001), 325-335.

Cheung, N., "Buy this! [e-commerce recommendation software]", *Information Age*, (Feb. 2001), 33-4.

Cheung, W., "Mining customer preference ratings for product recommendation using the support vector machine and the latent class model", *Proceedings of the 2nd International Conference on Data Mining Methods and Databases for Engineering, Finance and Other Fields*, Cambridge, UK, (Jul. 2000), 601-10.

Chien, Yi-Ying, "A personalized Internet shopping agent", *Proceedings of the International Conference on Parallel and Distributed Processing Techniques and Applications. PDPTA'2000*, pt. 4, (2000), 1849-55.

Chun, In-Gook, et al., "The implementation of knowledge-based recommender system for electronic commerce using Java expert system library", *International Symposium on Industrial Electronics*, 2001. Proceedings. ISIE 2001, vol. 3, (Jun. 12-16, 2001), 1766-1770.

Claypool, Mark, et al., "Inferring User Interest", *Computer Science Technical Report Series*, (1-17), May 2001.

Cotlier, Moira, "The Electronic Catalog: Upselling Online Can Raise Top Line", *Catalog Age*, 18(7), (Jun. 1, 2001), 93.

Demiriz, Ayhan, "Enhancing Product Recommender Systems on Sparse Binary Data", *E-Buisiness Department, Verizon, Inc.*, (2002), 1-17.

Ebizautos, "Better Presentations. Better Results on eBay Motors.", *eBizAutos—eBay Motors Aution Management System for Auto & Moorcysle Dealers*, www.ebizautos.com, (Printed May 21, 2002), 1 page.

Ebizautos, "eBay Motors Auction Management System for Auto & Motorcycle Dealers", http://www.ebizautos.com/, (Copyright 2001-2005), Web Page.

Greco, Carl, "What you should know before joining an Internet Mall", *Direct Marketing*, 61(10), (Feb. 1999), 42-3.

Harvey, L, ""On Birthdays" mortgages, ice cream sundaes, and term life. How personalization and corss selling tools provide cross-selling in the enterprise", *E-business Strategies & Solutions*, (Jul. 1999), 31-5.

Hirooka, Y, et al., "Recommending books of revealed and latent interests in e-commerce" *Industrial Electronics Society, 2000. IECON 2000. 26th Annual Conference of the IEEE*, vol. 3, (2000), 1632-1637.

Hirooka, Yasuo, et al., "Extending Content-Based Recommendation by Order-Matching and Cross-Matching Methods", *Lecture Notes in Computer Science: vol. 1875, Proceedings of the First International Conference on Electronic Commerce and Web Technologies*, (2000), 177-90.

Hong, Se June, et al., "A New Approach for Item Choice Recommendations", *Proceedings of the Third International Conference on Data Warehousing and Knowledge Discovery*, (2001), 131-140.

Iacobucci, Dawn, "Recommendation Agents on the Internet", *Journal of Interactive Marketing*, 14(3), (2000), 2-11.

IBM, "WebSphere Commerce Professional Edition", *Features at Glance*, www-3.ibm.com/software/webservers/commerce/wc_pe/morefeatures.html, (Printed May 21, 2002), 1 page.

Kanemoto, H, "Web Customer Action Analysis System", *Matsushita Technical Journal*, 48(1), (Feb. 2002), 26-9.

Karypis, George, "Evaluation of Item-Based Top-N Recommendation Algorithms", *Technical Report #00-046*, http://www-users.cs.umn.edu/~karypis/publications/Papers/PDF/itemrs.pdf, (2000), 1-13.

Kitts, Brendan, et al., "Cross-sell: A Fast Promotion-Tunable Customer-item Recommendation Method Based on Conditionally Independent Probabilities", *Proceedings of the sixth ACM SIGKDD international conference on Knowledge discovery and data mining*, Boston, MA USA, (Aug. 2000), 437-446.

Kohrs, Arnd, et al., "Using category-based collaborative filtering in the Active WebMuseum", *2000 IEEE International Conference on Multimedia and Expo, 2000. ICME 2000*, vol. 1, (Jul. 30-Aug. 2, 2000), 351-354.

Kumar, Ravi, "Recommendation Systems: A Probabilistics Analysis", *Journal of Computer and System Sciences*, 63(1), (Aug. 2001), 42-61.

Kwak, Mary, "Web Sites Learn to Make Smarter Suggestions", *MIT Sloan Management Review*, 42(4), (Summer 2001), 17.

Kwak, Mira, "Collaborative filtering with automatic rating for recommendation", *IEEE International Symposium on Industrial Electronics, 2001. Proceedings. ISIE 2001*, vol. 1, (Jun. 12-16, 2001), 625-628.

Kyeonah, Yu, "Improving the performance of collaborative recommendation by using multi-level similarity computation", *Artificial Intelligence and Soft Computing : Proceedings of the IASTED International Conference.*, (Jul. 24-26, 2000), 241-5.

Lee, Wee Sun, "Collaborative Learning for Recommender Systems", *Proceedings of the Eighteenth International Conference in Machine Learning*, (2001), 314-321.

Lin, Weiyang, et al., "Efficient Adaptive-Support Association Rule Mining for Recommender Systems", *Data Mining and Knowledge Discovery*, 6(1), (2001), 83-105.

Loney, Fred N, "Faceted Preference Matching in Recommender Systems", *Proceedings of the Second International Conference on Electronic Commerce and Web Technologies*, (2001), 295-304.

Maes, Pattie, et al., "Agents that Buy and Sell:", *Transforming Commerence as we Know it*, 1998 MIT Media Laboratory. Submitted to the Communications of the ACM, Mar. 1999 Issue, (1998), 12 pgs.

McAllister, Neil, "Getting Personal", *New Architect*, (Nov. 2001), 1-8.

McDonald, D W, "Expertise recommender: a flexible recommendation system and architecture", *Proceedings of the 2000 ACM conference on Computer supported cooperative work*, (2000), 231-240.

Nextag, "Computer Letter, Private Profiles—NexTag—of all the auction sites on the Web, here's one an economist might like", http://www.nextag.com/serv/main/about/computer/letter.html, (Aug. 23, 1999).

Pedersen, P., "Behavioral Effects of Using Software Agents for Product and Merchant Brokering: An Experimental Study of Consumer Decision-Making", *International Journal of Electronic Commerce*, 5(1), (Fall 2000), 125-141.

Pennock, David M, et al., "Social Choice Theory and Recommender Systems: Analysis of the Axiomatic Foundations of Collaborative Filtering", *Proceedings of the Seventeenth National Conference on Artificial Intelligence and Twelfth Conference on Innovative Applications of Artificial Intelligence*, (2000), 729-734.

Ramakrishnan, N, et al., "Privacy risks in recommender systems", *IEEE Internet Computing*, 5(6), (Nov.-Dec. 2001), 54-63.

Roe, Andy, "Amazon Adds Seller Services", http://www.auctionwatch.com/awdaily/dailynews/august99/3-081899.html, Accessed through following address—http://web.archive.org/web/20000816024400/http://www.auctionwatch.com/awdaily/dailynews/august99/3-081899.html, (Aug. 18, 1999), Web Page.

Sarwar, B., et al., "Analysis of recommendation algorithms for e-commerce", *Proceedings of the 2nd ACM conference on EC*, (2000), 158-167.

Sarwar, Badrul, et al., "Item-based Collaborative Filtering Recommendation Algorithms", *WWW10 Conference*, (May 1-5, 2001), 1-11.

Schafer, J, et al., "E-commerce recommendation applications", *Data Mining and Knowledge Discovery*, 5(1-2), (2001), 115-153.

Schafer, J. Ben, et al., "Recommender Systems in E-Commerce", *Department of Science and Engineering—University of Michigan*, (2001), 1-9.

Schien, Andrew I, et al., "Methods and Metrics for Cold-Start Recommendations", *Proceedings of the 25th Annual International ACM SIGIR Conference on Research and Development in Information Retrieval (SIGIR 2002)*, (2002), 1-9.

Schubert, Petra, "Virtual Communities of Transaction:The Role of Personalization in Electronic Commerce", *Electronic Markets Journal*, 10(1), (2000), 1-13.

Seitz, Juergen, et al., "Impacts of Software Agents in E-Commerce Systems on Customer?s Loyalty and on Behavior of Potential Customers", *Chapter 13 from Strategies for eCommerce Success: by Bijan Fazlollahi*, IRM Press, 2000, 9 pgs.

Towle, Brendon, et al., "Knowledge Based Recommender Systems Using Explicit User Models", *Knowledge Based Electronic Markets*, 2000, 74-7.

Tran, T., "Hybrid Recommender Systems for Electronic Commerce", *Proceedings of the Seventeenth National Conference on Artificial Intelligence (AAAI-00) Workshop on Knowledge-Based Electronic Markets*, 2000, 78-84.

Websphere, "WebSphere Commerce Professional Edition—Features", http://www-306.ibm.com/software/genservers/commerce/wcpe/, (Downloaded Apr. 21, 2005), Webpage.

Wilder, C, et al., "E-Commerce Emerges", *Information Week*, No. 584, (Jun. 17, 1996), 14-15.

"Australia Application No. 2006262446, mailed on Mar. 20, 2009", 3 pgs.

"U.S. Appl. No. 10/689,970, Appeal Brief filed Jun. 28, 2007", 26 pgs.

"U.S. Appl. No. 10/689,970, mailed Oct. 2, 2007", 14 pgs.

"U.S. Appl. No. 10/689,970, Reply Brief filed Dec. 3, 2007 mailed Oct. 2, 2007", 10 pgs.

"Chinese Application Serial No. 200680022268.9, Office Action Mailed Jul. 26, 2009", 28 pgs.

"International Application Serial No. PCT/US03/33294, International Preliminary Report on Patentability mailed Jan. 30, 2006", 4 pgs.

"International Application Serial No. PCT/US03/33294, International Search Report mailed Jun. 14, 2005", 8 pgs.

"International Application Serial No. PCT/US03/33294, Written Opinion mailed Sep. 28, 2005", 4 pgs.

"International Application Serial No. PCT/US2006/023807, International Preliminary Report on Patentability mailed Jan. 10, 2008", 5 pgs.

"International Application Serial No. PCT/US2006/023807, International Search Report and Written Opinion mailed Feb. 28, 2007", 9 pgs.

"U.S. Appl. No. 11/869,290, Non-Final Office Action mailed Dec. 24, 2009", 29 Pgs.

"U.S. Appl. No. 10/889,970, Notice of Allowance mailed Jan. 20, 2010", 9 Pgs.

"Australian Application No. 2006262446, Mailed Jan. 15, 2010", 2 pgs.

"U.S. Appl. No. 10/689,970, Notice of Allowance mailed Jun. 29, 2010", 6 pgs.

"U.S. Appl. No. 11/869,290, Final Office Action mailed Jul. 8, 2010", 27 pgs.

"U.S. Appl. No. 11/869,290, Response filed Apr. 26, 2010 to Non Final Office Action mailed Dec. 24, 2009", 17 pgs.

"U.S. Appl. No. 10/689,970, Supplemental Notice of Allowability mailed Jul. 26, 2010", 6 pgs.

"U.S. Appl. No. 11/869,290, Response filed Nov. 8, 2010 to Final Office Action mailed Jul. 8, 2010", 19 pgs.

"U.S. Appl. No. 11/869,290 Final Office Action mailed Jul. 8, 2010", 28 pages.

"European Application Serial No. 06773535.7, Extended European Search Report mailed Sep. 24, 2010", 9 Pgs.

"Japanese Application Serial No. 2008-517212, Office Action mailed Aug. 3, 2010", 6 Pgs.

"Japanese Application Serial No. 2008-517212, Office Action Response Filed Oct. 28, 2010", 23 pgs.

Linden, G, et al., "Amazon.com recommendations item- to- item collaborative filtering", IEEE Internet Computing vol. 7, No. 1, DOI : 10.1109/MIC 2003; XP011095524, (Jan. 1, 2003), 76-80.

Ohkubo, M., et al., "Extracting Information Demand by Analyzing a WWW Search Log", Transactions of Information Processing Society of Japan, 39(7), (Jul. 15, 1998), 2250-2258.

"Australian Application Serial No. 2010202828, mailed Aug. 20, 2011", 1 pg.

"European Application Serial No. 06773535.7, EP Search Report", 13 pgs.

"Japanese Application Serial No. 2008-517212, Office Action mailed Apr. 12, 2011", 6 pgs.

"U.S. Appl. No. 12/870,022, Non Final Office Action mailed Mar. 17, 2011", 13 pgs.

"Australian Application Serial No. 2006262446, Response filed Dec. 14, 2009 to mailed Mar. 20, 2009", 24 pgs.

"Australian Application Serial No. 2006262446, Response filed Mar. 23, 2010 mailed Jan. 15, 2010", 25 pgs.

"Chinese Application Serial No. 200680022268.9, Office Action mailed Nov. 17, 2010", 3 pgs.

"Chinese Application Serial No. 200680022268.9, Office Action Received Jan. 7, 2011", 17 pgs.

"Chinese Application Serial No. 200680022268.9, Office Action Received Aug. 11, 2009", 30 pgs.

"Chinese Application Serial No., Response filed Feb. 9, 2011 to Non Final Office Action mailed Nov. 17, 2010", 40 pgs.

"U.S. Appl. No. 11/869,290, Notice of Allowance mailed Aug. 22, 2011", 6 pgs.

"U.S. Appl. No. 12/870,022, Response filed Sep. 13, 2011 to Final Office Action mailed Jul. 28, 2011", 13 pgs.

"U.S. Appl. No. 12/870,022, Advisory Action mailed Jan. 19, 2012", 3 pgs.

"U.S. Appl. No. 12/870,022, Advisory Action mailed Sep. 26, 2011", 3 pgs.

"U.S. Appl. No. 12/870,022, Advisory Action mailed Nov. 9, 2011", 4 pgs.

"U.S. Appl. No. 12/870,022, Appeal Brief Based on Pre-Appeal Brief Review Filed Jan. 10, 2012", 23 pgs.

"U.S. Appl. No. 12/870,022, Decision on Pre-Appeal Brief mailed Nov. 14, 2011", 2 pgs.

"U.S. Appl. No. 12/870,022, Final Office Action mailed Jul. 28, 2011", 15 pgs.

"U.S. Appl. No. 12/870,022, Pre-Appeal Brief Request filed Oct. 4, 2011", 5 pgs.

"U.S. Appl. No. 12/870,022, Response filed Jun. 3, 2011 to Non Final Office Action Mar. 17, 2011", 16 pgs.

"U.S. Appl. No. 13/247,798, Preliminary Amendment Filed Oct. 4, 2011", 3 pgs.

"Australian Application Serial No. 2010202828, Response filed Sep. 28, 2011 to Office Action mailed Apr. 20, 2011", 7 pgs.

"Japanese Application Serial No. 2008-517212, Office Action Response filed", 10 pgs.

"Query—Definition by Dictionary.com", [Online]. Retrieved from the Internet: <http://dictionary.reference.com/browse/query>, (Accessed 2011), 1 pg.

"Chinese Application Serial No. 200680022268.9, Office Action mailed Mar. 23, 2012", 7 pgs (English translation provided).

U.S. Appl. No. 12/870,022, filed Aug. 27, 2010, Listing Recommendation in a Network-Based System.

U.S. Appl. No. 12/870,031, filed Aug. 27, 2010, Listing Recommendation in a Network-Based Commerce System.

U.S. Appl. No. 13/247,798, filed Sep. 28, 2011, Electronic Publication System.

"Australian Application Serial No. 2012200347, Office Action mailed Mar. 15, 2012", 2 pgs.

* cited by examiner

| FERRARI | ALL CATEGORIES ▽ | SEARCH | ADVANCED SEARCH |

☐ SEARCH TITLE AND DESCRIPTION

RELATED SEARCHES : LAMBORGHINI, PORSCHE, BENTLEY, ASTON MARTIN, MASERATI

RELATED SEARCHES
TOP 9 RELATED SEARCHES FOR EBAY

SEARCH REFINEMENTS:
- EBAY MOTORS
- EBAY.COM
- BOOKS ON EBAY
- EBAY AUCTION
- EBAY EDUCATION
- EBAY STORES
- MY EBAY
- EBAY UNIVERSITY
- SELLING ON EBAY

RELATED SEARCHES
TOP 15 RELATED SEARCHES FOR EBAY

SEARCH REFINEMENTS:
- EBAY MOTORS
- EBAY.COM
- BOOKS ON EBAY
- EBAY AUCTION
- EBAY EDUCATION
- EBAY STORES
- MY EBAY
- EBAY UNIVERSITY
- SELLING ON EBAY

SEARCH ALTERNATIVES:
- HALF.COM
- RENT.COM
- PAYPAL
- CRAIG'S LIST
- PAYPAL CREDIT CARD
- AUCTION NEWS

RELATED SEARCHES

SEARCH REFINEMENTS:
- ROLEX SUBMARINER
- ROLEX WATCH
- ROLEX DAYTONA
- ROLEX EXPLORER
- MENS ROLEX
- ROLEX OYSTER
- ROLEX BAND
- LADIES ROLEX
- ROLEX DATEJUST

RELATED SEARCHES

SEARCH REFINEMENTS:
- ROLEX SUBMARINER
- ROLEX DATEJUST
- ROLEX OYSTER
- ROLEX WATCH
- ROLEX EXPLORER
- ROLEX IMITATION WATCHES
- ROLEX DAYTONA
- MENS ROLEX
- ROLEX BAND

SEARCH ALTERNATIVES:
- OMEGA
- MOVADO
- DESIGNER WATCHES
- TAG HEUER DESIGNER WATCHES
- TIFFANY
- LADIES JEWELRY WATCHES
- CARTIER
- CLASSIC WATCHES
- MENS WATCHES

SYSTEM TO GENERATE RELATED SEARCH QUERIES

CROSS-REFERENCE TO RELATED APPLICATION(S)

This application claims the benefit of U.S. Provisional Application No. 60/692,125, filed on Jun. 20, 2005, under 35 U.S.C. §119(e), which is hereby incorporated by reference.

TECHNICAL FIELD

The present application relates generally to the field of data access and searching.

BACKGROUND

Networked commerce systems, such as Internet-based auction systems, depend upon user specified searches to locate items of commerce. While some users are highly skilled at locating desired items, a large segment of users lack knowledge helpful in navigating such systems. As a result, inefficient use of the system and a lack of user traffic to some commerce items can be experienced.

To increase sales, some commerce systems have provided recommendations to users based upon purchasing performance of prior users. For example, when viewing a product the system may indicate that users who purchased the product also purchased a second identified product. This system does not assist the user in navigating but merely provides suggestions to increase sales.

What is needed is a system to assist users in navigating a network based commerce system.

BRIEF DESCRIPTION OF THE DRAWINGS

FIGS. 3-5 are additional page views of user interfaces;

Figure 12:
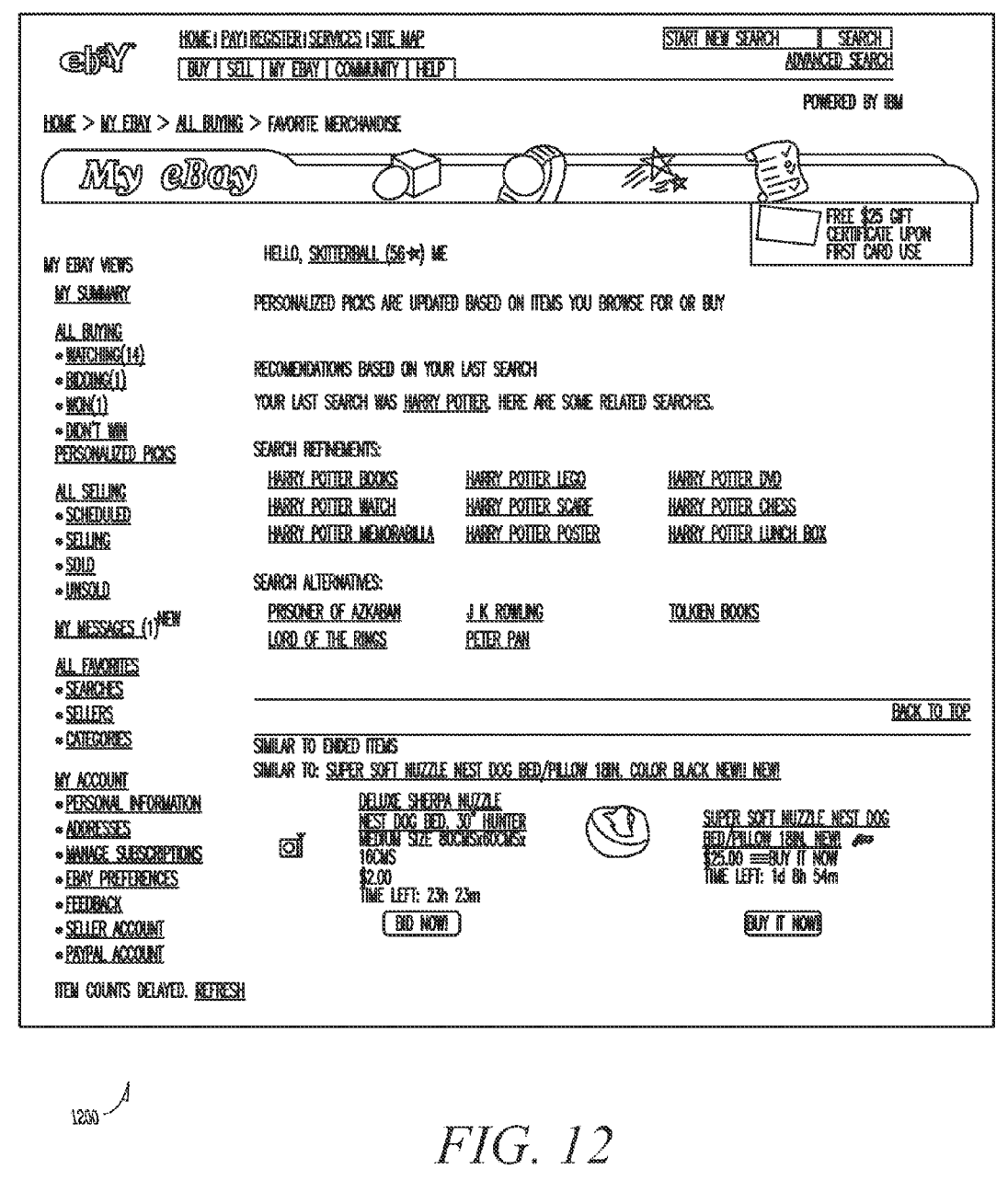

FIGS. 7-13 are additional page views of user interfaces;

DETAILED DESCRIPTION

Figure 1:
FIG. 1 is a page view of a user interface.

In one example embodiment, new recommendations are provided to a search interface to assist users in navigating toward new searches that are likely to generate results aligned with the user's searching intentions. In one embodiment, an algorithm analyzes previous search sessions to determine a "next best place" for the user to go. In an example of a commerce system, new information placement may be added to the top of search and listings pages to show links to new searches that can be run by the user. On a periodic basis, the search recommendations may be updated, for example based on the most current changes in user behavior. For example see the page view 100 of FIG. 1. Where a search term "Ferrari" in "all categories" provides related search suggestions of "Lamborghini", "Porsche", "Bentley", "Aston Martin" and "Maserati."

An embodiment seeks to improve the searching experience by directing users to searches that have proven successful in the past. Users who execute one of the search recommendations may be more successful searching for, and locating, data items of interest. The recommended additional search options may prove useful to non-expert users of a data resource, specifically those users who need more guidance on which search terms they should use to successfully find data items on a data resource.

User provided searches that are determined to be of poor quality can include offensive terms, terms that are not relevant, and terms that drive the user more in a particular direction than another (e.g., toward a particular type of brand instead of a competing brand, in a commerce environment). As such, recommended alternate searches can be provided.

In one example embodiment, a search and recommendation engine seeks to provide recommendations for a further search (e.g., query terms) based on the observed (or recorded) behavior of users of the search and recommendation engine with respect to an information resource. For example, the search and recommendation engine, after having received a first search query including the term "Toyota", may recommend a further search query including the term "Honda". The recommendation of the further search query is based upon, in one embodiment, having observed (or recorded) that a certain threshold number of users provided search queries including the term "Honda", subsequent to providing a search query including the term "Toyota".

Further, in the example embodiment, whether or not the search and recommendation engine recommends the further search query (and also how the search engine ranks the further search query) may be based on post-search user or system behavior (or activities) with respect to the information resource. For example, where the search engine recorded that the further search query (e.g., including the term "Honda") previously delivered less than a predetermined number of search results, a recommendation ranking with respect to the further search query (relative to other candidate search queries) may be reduced.

Where the search and recommendation engine recorded the presence (or absence) of certain post-search user behavior, this information may be utilized to rank the further search query and/or utilized to determine whether to provide the further search query as a recommended search query. For example, in the context of a commerce system, where the recorded past user behavior indicated that, subsequent to a particular candidate search recommendation, a threshold number of users purchased (or entered into bidding or some other transaction activity) with respect to one or more products/services identified by the particular candidate search recommendation, such a particular candidate search recommendation may receive a higher recommendation ranking than a further candidate search recommendation that did not result in transaction activity. In one example, the search and recommendation engine may track the number of users that performed search A, then performed search B, and then performed certain post-search activity with respect to a result set returned by search B. Accordingly, it will be the appreciated that a recommended search query (e.g., search B) may or may not include terminology that is common with a preceding, base search query (e.g., search A) that is utilized to generate (or identify) the recommended search query.

In one example embodiment, an algorithm implemented by the search and recommendation engine analyzes tracked (or logged) session data to determine other searches that are later in the path of page views for users who ran the same (or a similar) query as is currently being run, and who were eventually successful in a specified or predetermined activity (e.g., in placing a bid, in a network-based auction system).

Figure 2:
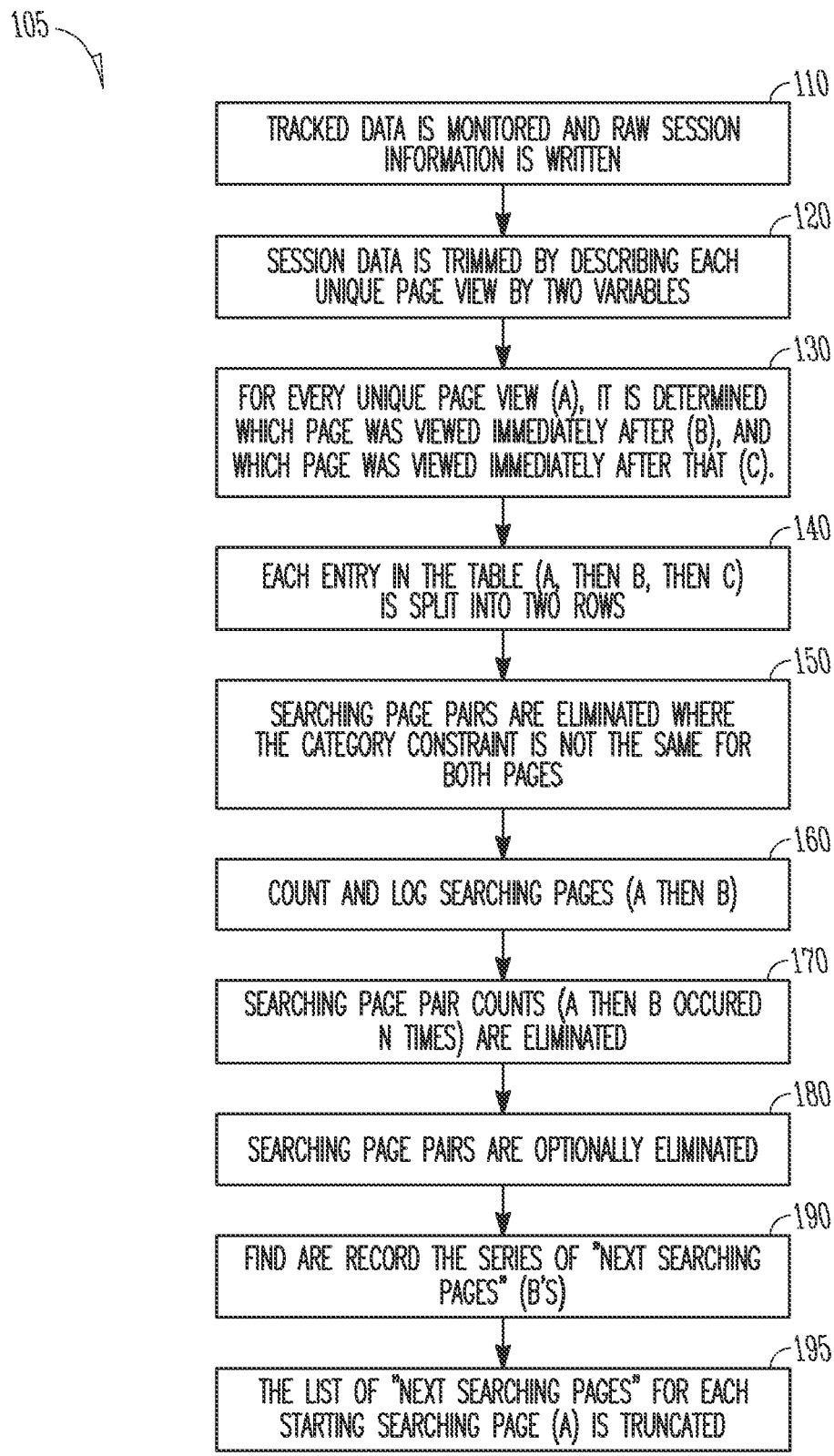
FIG. 2 is a flow chart illustrating a method of one embodiment.

Referring to both FIG. 2 and Table 1 a method is described for an algorithm 105 to generate search recommendations that can be offered to a user. At operation 110, Tracked data is monitored and raw session information is written based on LOOKBACK_PERIOD and SAMPLING_RATE configurations. At operation 120, the session data is trimmed by describing each unique page view by two variables only: the search phrase and the category constraint. The search term and category constraint are an input variable that refers to a combination of a keyword (or other search phrase or input) and a category constraint. The keyword can be null if there is a category constraint and the category constraint can be the root category if there is a keyword applied. For each Searching page (A), the search phrase (A1) and the category constraint (A2) are logged.

At operation 130, for every unique page view (A), it is determined which page was viewed immediately after (B), and which page was viewed immediately after that (C). At 140, each entry in the table (A, then B, then C) is split into two rows, where the first row is the unique page view in question followed by the next page view (A then B) and the second row is the page view in question followed by the page view after that (A then C). Now, each unique page view should have two rows in this table, unless the page view was the last or second to last in the user's session.

At operation 150, all Search page pairs are eliminated where the category constraint is not the same for both pages or the search phrase is the same for both pages. This may leave a list of Searching page pairs where the category constraint has not changed but the search phrase has. In another embodiment, the search pairs are not eliminated where the category constraint is not the same, but the search phrase is the same. In this embodiment, the system generates recommendations to the user to perform the same search phrase in a different category. Further, where both the category constraint and search phrase change the system can provide a recommendation of expected success based upon prior user performances.

The number of times that each pair of Searching pages (A then B) appears in the exact same order is counted at operation 160 and that number is logged for each Searching page pair (A then B occurred N times). At operation 170, all Searching page pair counts (A then B occurred N times) are eliminated where the number of times that sequence was run (N) was less than the MIN_TRAFFIC_COUNT parameter.

All Searching page pairs are optionally eliminated at operation 180 where the category constraint is in the Mature Audiences category, any word in either of the two search phrases is on a blacklist for that site, or the search phrase contained complex search operators (such as minus, parentheses, etc.) For each starting Searching page (A), at operation 190 the method finds and records the series of "next Searching pages" (B's) in descending order of how many times the Searching page pair was counted (For A:B occurred 12 times, C occurred 9 times, D occurred 6 times, E occurred 4 times). Finally, at operation 195, the list of "next Searching pages" for each starting Searching page (A) is truncated so that it does not exceed the MAX_REL_SEARCHES parameter.

TABLE 1

| Configuration | Description | Configurable By |
|---|---|---|
| SAMPLING_RATE | This is the percentage of sessions that are fed into the Related Searches raw data in step 1 (below). | Site |
| LOOKBACK_PERIOD | This is the amount of time the Related Searches algorithm may look back to consider which searches are related to which Searching pages. Data older than this period may be ignored. | Site |
| UPDATE_PERIODICITY | This is the length of time that should go by between updates to the Related Searches output. It establishes a frequency for updating the recommendations and feeding those updates into Production. | Global |
| MIN_TRAFFIC_COUNT | This is the minimum number of users who may have independently run the same sequence of searches for a Related Search recommendation to be considered good enough to be counted. | Site |
| MAX_REL_SEARCHES | This is the maximum number of Related Searches that should be stored for a given search phrase-category pair. | Global |

Displaying Related Searches on Search, Listings, and Cross-Stores Search

The Related Searches module may appear on Searching pages as an additional line of links below the search box, as shown in the page view 300 of FIG. 3. The Related Searches placement is based on a current query that the user is running. To determine which related searches to display, the system may analyze the search phrase and the category constraint, ignoring everything else, except attributes.

Related Searches may not appear if certain predetermined conditions are present, for example the current query contains an attribute constraint, or the current query is a title and description search. Whether the Related Searches placement appears, in the example embodiment, depends on whether there are recommendations available given the current search phrase and category constraint. Whether the Related Searches function is invoked also depend on whether other types of recommendations that also appear on the Searching page, in a further example embodiment.

Resolving Recommendation Conflicts

In one embodiment, there are multiple types of search modification (or enhancement) recommendations that can appear on Searching pages. For example, Related Searches, Spell Check, RIS (Recommendation in Search) and PTS (Product Titles in Search) search modification recommendations. Recommendations developed by the Relates Searches algorithm could conflict/overlap with some of the recommendations from the other systems. To avoid redundancy, conflict solution logic may determine how the recommendations co-exist, as explained below.

Resolving Conflicts with Spell Check

Figure 4:
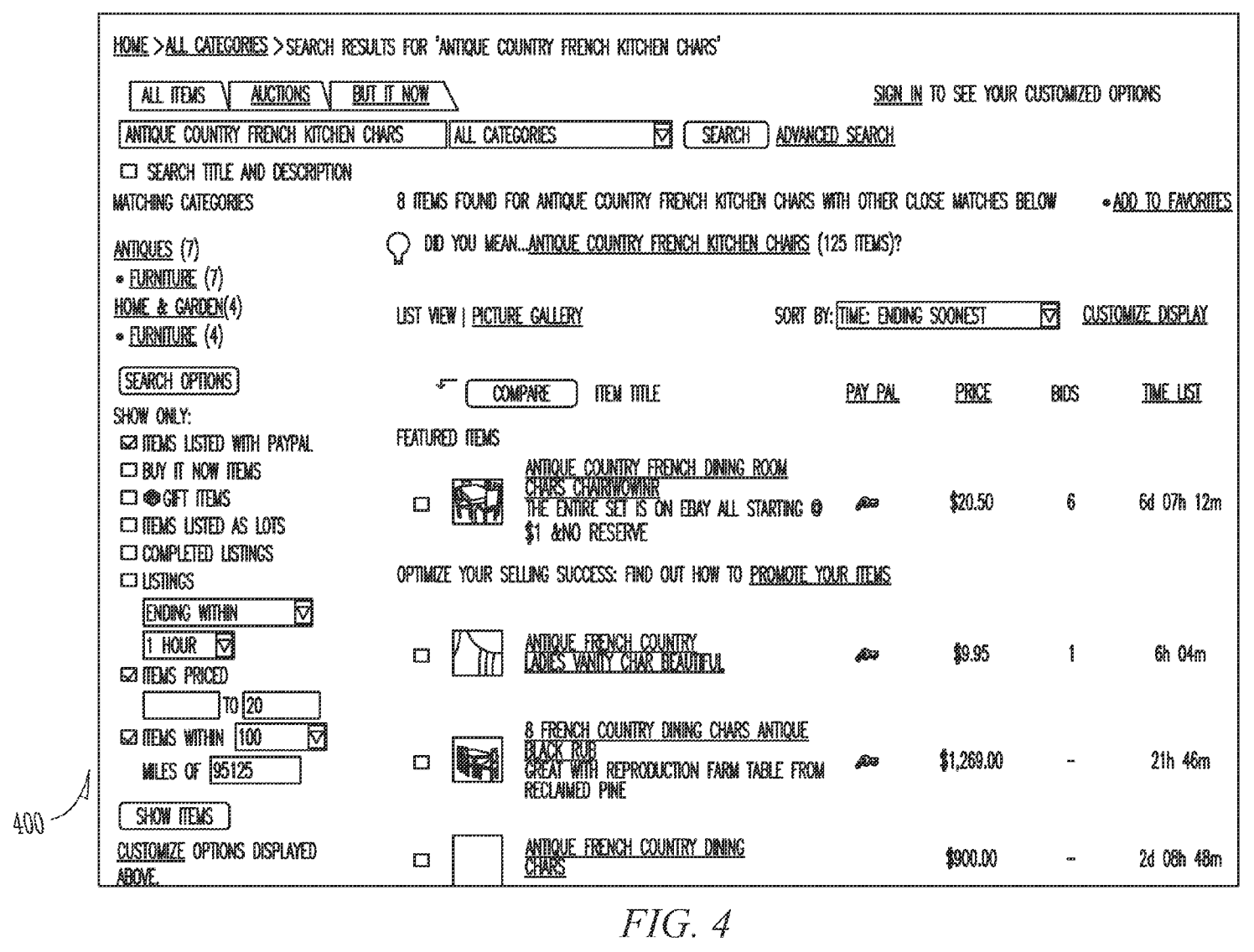

If a Spell Check recommendation surfaces (based on the existing surfacing rules), then the Related Searches module may not appear, in one example embodiment. See FIG. 4 for a page view 400 of an example spell check recommendation correcting the term "chars" with "chairs".

Resolving Conflicts with PTS

If one or more PTS (Product Titles in Search) recommendations surfaces (based on existing surfacing rules), then the Related Searches module may appear, but the list of recommendations appearing may be filtered to avoid displaying recommendations that overlap too closely with PTS.

In one example embodiment, the only recommendations that may be allowed in the Related Searches module while PTS recommendations appear are ones where the search terms in the recommendation are not a superset of the search terms in the current query. Related Searches recommendations where additional keywords are added to the query but no keywords are changed may not be acceptable when PTS appears.

Figure 5:

For example, if the user was searching on "Top Gun" in the DVDs category PTS recommendations appear; in this case a Related Searches recommendation for "Mission Impossible" is allowed, but a recommendation for "Top Gun DVD New" is not allowed. Referring to FIG. 5, a page view 500 example is illustrated wherein a search for "Deception Point" provides related searches for "Angels and Demons" and "Digital Fortress".

Resolving Conflicts with RIS

The potential conflict between Related Searches and RIS (Recommendation in Search) can be handled by a new configuration (RIS_CONFLICT). There may be three possible values for RIS_CONFLICT, and the setting may determine exactly how Related Searches and RIS interact, see Table 2. As known to those in the art, a 'widget' is typically a rectangular section (like a module) on a web page used to demarcate different logical pieces of information on a web page. Most web pages are composed of various widgets showing different types of information. Sometimes users are given the choice to customize what widgets they want to see and which widgets they don't want to see.

TABLE 2

| RIS_CONFLICT Setting | Required Interaction |
|---|---|
| RIS Wins | If a RIS recommendation surfaces (based on the existing surfacing rules), then a Related Searches widget may not be shown |
| Related Searches Wins | If, based on the rules described above, a Related Searches widget would appear, then no RIS recommendations may be shown |
| RIS and Related Searches Coexist | Related Searches and RIS recommendations can appear independent of each other; however, in the event that the Related Searches widget does appear, the maximum number of RIS recommendations that could otherwise be shown (currently set to 3) would be reduced by 1 (down to 2) |

Figures 7, 8A:
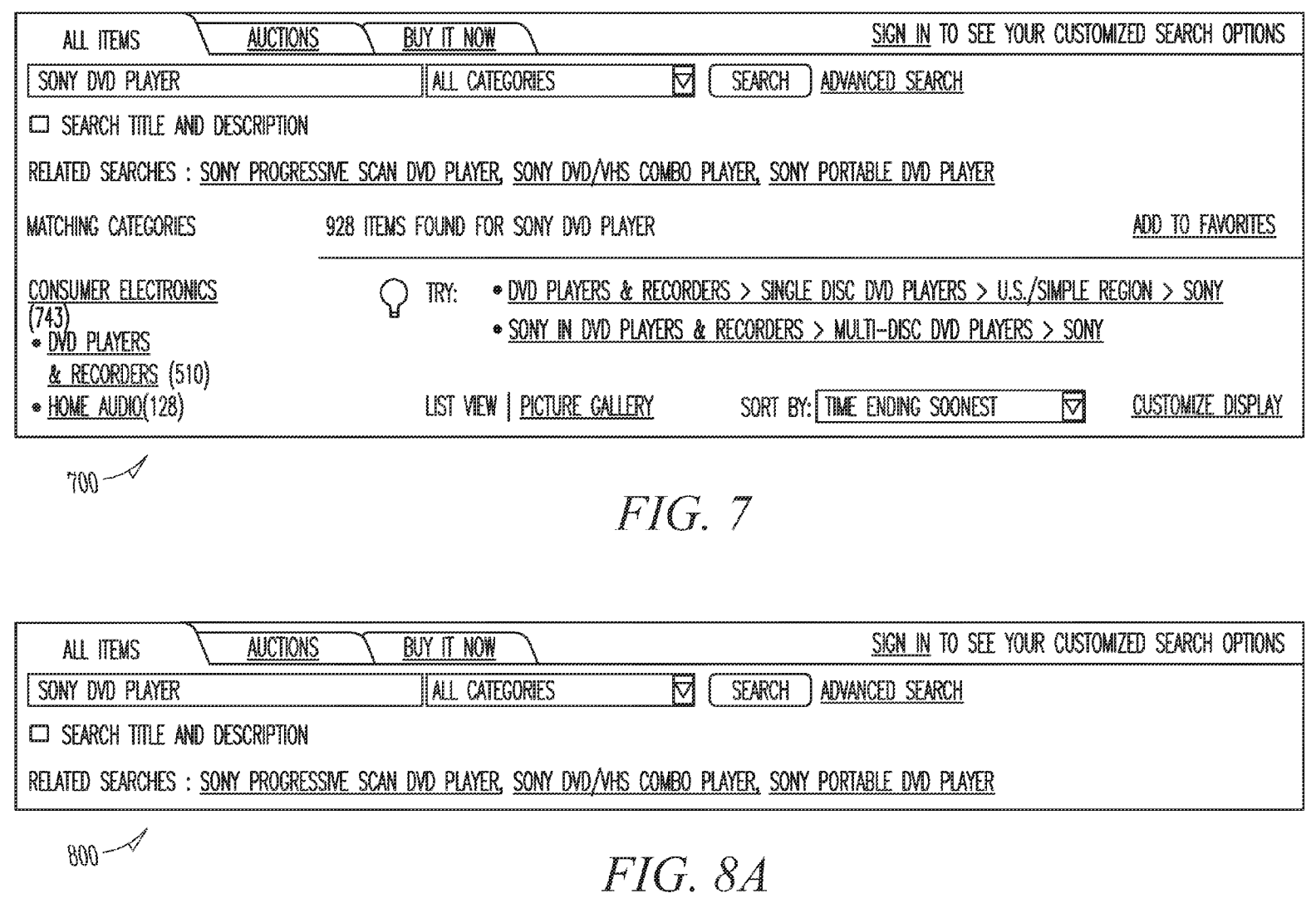

The default setting for RIS_CONFLICT for all sites may be "RIS and Related Searches Coexist". The example page view 700 of FIG. 7 shows how Related Searches and RIS recommendations may appear together based on this setting.

Determining the Recommendations to Display

When displayed subject to the conflict resolution rules above, the Related Searches widget may appear immediately below the search box. Recommendations may always appear as individual links oriented horizontally in a single row. Five site-specific configurations may govern the display properties of the Related Searches widget, as shown in Table 3.

TABLE 3

| Configuration | Description | Default Values |
|---|---|---|
| MIN_ATTEMPTED_SA_RECOS | This is the minimum number of search alternative-type recommendations that may be displayed before refined search-type recommendations are displayed | All sites: 0 |
| MIN_ATTEMPTED_RS_RECOS | This is the minimum number of refined search-type recommendations that may be displayed before search alternative-type recommendations are displayed | All sites: 0 |
| MAX_REL_SEARCHES | This represents the absolute maximum number of Related Searches recommendations allowed to appear in the Related Searches widget, regardless of space constraints. | All sites: 5 |
| TOTAL_CHAR_LIMIT | This represents the maximum number of characters allowed for the sum of all the Related Searches recommendations displayed in the widget (including comma separators and spaces), ensuring the recommendations do not take up more than one line in the HTML. | All other sites: 100 |

TABLE 3-continued

| Configuration | Description | Default Values |
|---|---|---|
| RECO_TYPE_ORDER | This is the order in which search alternatives and search refinements relative to each other. | All sites: search alternatives appear before search refinements |

Turning off Related Searches with MAX_REL_SEARCHES can be performed as follows. If MAX_REL_SEARCHES is set to 0, then Related Searches may not appear on any page (e.g., search, listings, cross-stores search, dynamic landing page (DLP), Personalized web page). Otherwise, MAX_REL_SEARCHES only has impact on the Searching pages (e.g., search, listings, cross-stores search). In other words, MAX_REL_SEARCHES influences search, listings, and cross-stores search only, but works as a universal feature shut-off switch when set to 0.

Given that MAX_REL_SEARCHES is not set to zero, recommendations may be selected to appear on search, listings, and cross-stores searches as follows. If the sum of MIN_ATTEMPTED_RS_RECOS and MIN_ATTEMPTED_SA_RECOS is greater than MAX_REL_SEARCHES, then both MIN_ATTEMPTEDRS_RECOS and MIN_ATTEMPTED_SA_RECOS may be ignored. (This situation makes no sense, and is an indication that the parameters have been incorrectly set.)

Figure 6:
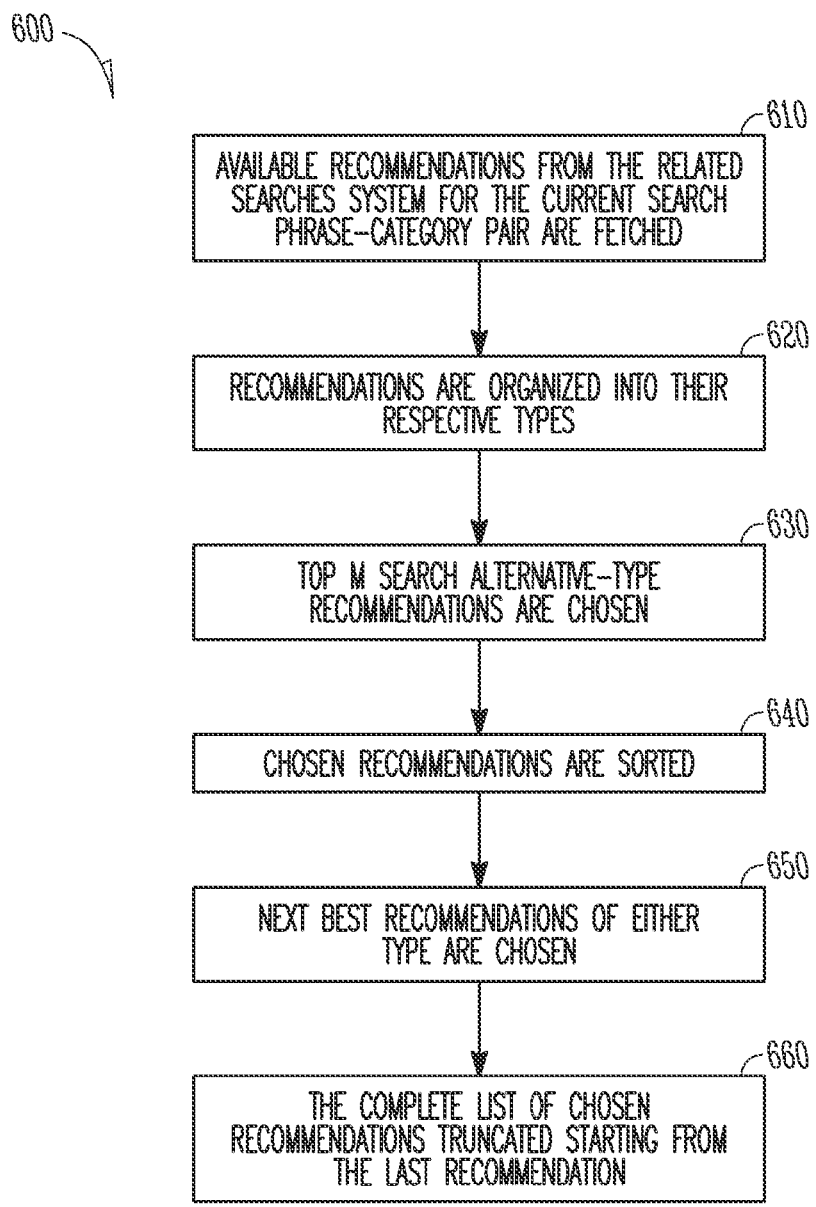
FIG. 6 is a flow chart illustrating a method of one embodiment.

Referring to FIG. 6 a flow chart 600 is described for managing the recommendations to display. At operation 610 all the available recommendations coming from the Related Searches system for the current search phrase-category pair are fetched. At operation 620 the recommendations are organized into their respective types. If all of the keywords of the current search phrase can be found in the search phrase of the recommendation, then the recommendation type is refined search else, the recommendation type is search alternative.

At operation 630 the top M search alternative-type recommendations are chosen (based on frequency count, as described in the Related Searches algorithm section), where M is the setting for MIN_ATTEMPTED_SA_RECOS. Also choose the top N refined search-type recommendations (based on frequency count, as described in the Related Searches algorithm section), where N is the setting for MIN_ATTEMPTED_RS_RECOS. The chosen recommendations are sorted at operation 640 by type, then by frequency count highest to lowest, where the preferred type is determined by the setting of RECO_TYPE_ORDER.

At operation 650, the next best recommendations of either type are chose until the total number of recommendations chosen is equal to MAX_REL_SEARCHES. These recommendations may be ordered after the recommendations already selected. The sort order within this set may be based on frequency count only. Finally, at operation 660 the complete list of chosen recommendations truncated starting from the last recommendation, until the total number of characters of the recommendations (taking into consideration the four characters that may separate each recommendation) is not greater than the MAX_CHAR parameter.

If, after executing these rules, there are no Related Searches recommendations to display, then the Related Searches widget may not appear at all, and the space it otherwise would have taken up would collapse. When presented, the recommendations in the Related Searches widget may always be sorted by highest-relevance first.

Display Properties

In one example embodiment, Related Searches recommendations may be displayed based on the following rules. The section label may be "Related Searches" or the section label may be "Hot Keywords." After each recommendation link (except the last recommendation link), a comma (not hyperlinked) may be shown. Additionally, characters may separate each recommendation, any words in a recommendation link that are being used in the current query may appear in bold, and any words in a recommendation link that are not being used in the current query may not appear in bold. For double byte sites the font size may be standard and for all other sites, the font size may be small.

Figure 8B:
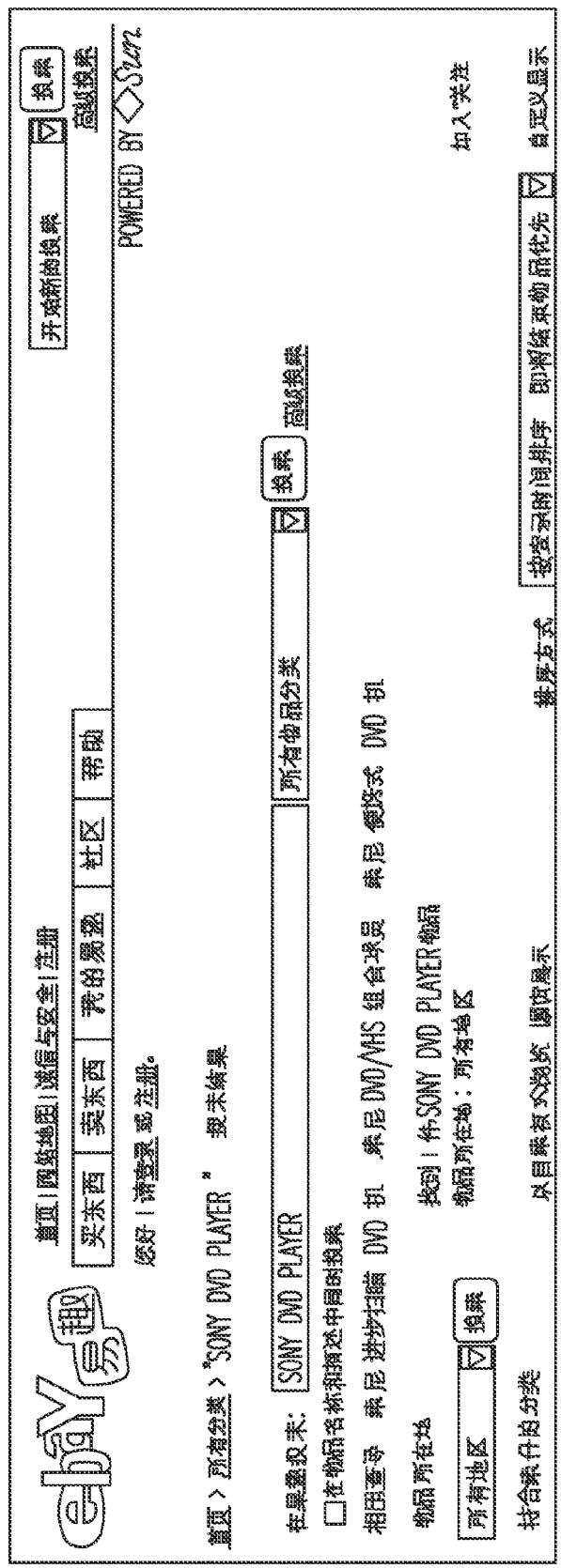

FIG. 8A illustrates an example page view 800 for use in an English language location other Western locations. Similarly FIG. 8B illustrates an example page view 810 for a non-English speaking location.

Navigation

Clicking on a Related Search recommendation may navigate the user to another Searching page where the previous search phrase is altered to the new search phrase but all other search parameters/filters/sorts have been maintained. For example, if no category constraint had been applied before the recommendation was clicked, then no category constraint would be applied after. If a category constrain had been applied before the recommendation was clicked, then the same category constraint would also be applied after. Any additional filters (search options, tab selections, etc.) would also be maintained after the recommendation was clicked. The search that the user had applied would continue to be applied after the recommendation was clicked. If the user was in cross-stores search, he would remain in cross-stores search. If he was in core search, he would remain in core search.

ssPageName Tracking ssPageNames may be added to the end of the anchors for each recommendation link. The formatting of the appended ssPageName may be &ssPageName=RELS:SA<X>:RS<Y>:<TYPE> where <X> may be an integer value (0-n). It may be the count of the number of search alternative-type recommendations that were displayed in the related searches widget <Y> may be an integer value (0-n). It may be the count of the number of refined search-type recommendations that were displayed in the related searches widget <TYPE> may be one of two values: RS or SA. RS may be the value if the recommendation type (for that link) is refined search and SA may be the value if the recommendation type (for that link) is search alternative

Examples of ssPageNames

Example 1: If two search alternative recommendations and three refined search recommendations are shown, the ssPageName for each search alternative recommendation may be &ssPageName=RELS:SA2:RS3:SA and the ssPageName for each refined search-type recommendation may be &ssPageName=RELS:SA2:RS3:RS.

Example 2: If zero search alternative recommendations and four refined search recommendations are shown, the ssPageName for each refined search-type recommendation may be &ssPageName=RELS:SAO:RS4:RS.

Recommendation Organization

If there are no recommendations available for a current search, such as used by a DLP (dynamic landing page), then the Related Searches module may not appear at all. A DLP is an intermediate search page which provides the user with multiple navigation options based upon their original search query, therefore for the purposes of this invention it can be classified as a search page. If there are recommendations available for the current DLP search, then the Related Searches module may appear. To determine how to display the recommendations, they may first be organized into search refinements and search alternatives based on the same logic as described above.

If there are search refinements but not search alternatives to display, the search refinements may take up the entire module. Search refinements may be shown in three columns, ordered first by row, then by column, as shown below:

| Link 1 | Link 2 | Link 3 |
| Link 4 | Link 5 | Link 6 |
| Link 7 | Link 8 |        |

A maximum of 15 search refinements can be shown when only search refinements appear.

If there are search alternatives but not search refinements to display, the search alternatives may take up the entire module. Search alternatives may be shown in three columns, ordered first by row, then by column, as shown below:

| Link 1 | Link 2 | Link 3 |
| Link 4 | Link 5 | Link 6 |
| Link 7 | Link 8 |        |

A maximum of 15 search alternatives can be shown when only search alternatives appear.

If both types of recommendations (search refinements and search alternatives) are available for the DLP, then the recommendations may be split into two sections by a graphical horizontal separator. For each section, related searches may be shown in three columns, ordered first by row, then by column, as shown below:

| Link 1 | Link 2 | Link 3 |
| Link 4 | Link 5 | Link 6 |
| Link 7 | Link 8 |        |

The ordering of the two subsections in the DLP may depend on the RECO_PREFERENCE_TYPE parameter setting described above. If RECO_PREFERENCE_TYPE is Search Refinements, then search refinements may appear above search alternatives. If RECO_PREFERENCE_TYPE is Search Alternatives, the search alternatives may appear above search refinements.

Regardless of whether the widget is split, a label for the applicable recommendation type may appear above the recommendations. The label for search refinements can be "Search Refinements:" and the label for search alternatives can be "Search Alternatives:".

In the base template, the total number of recommendation links appearing may be shown. (See site text "Top <N> related searches for <X>".) N always represents the total number of both types of recommendations. This supplemental text is not included in the specific item template.

A "Base Template" user interface 900 design with only search refinements appearing is illustrated in FIG. 9A. A "Base Template" user interface 910 design with both recommendation types appearing is illustrated in FIG. 9B. Similarly, a "Specific Item Template" interface design 1000 with only refines searches appearing is illustrated in FIG. 10. FIG. 11 illustrates a "Specific Item Template" interface 1100 design with both recommendation types appearing.

Displaying Related Searches on the Personalized Web Page

Search pages, listing pages, and DLPs may require new functionality to write information to a cookie. When viewed, each of these types of pages may update the cookie. The following logic may be used to determine whether the Search results pages, Listings pages, and DLPs may update this cookie. If the search contains an attribute value constraint, do not update the cookie. If the search is a title and description search, do not update the cookie. If the search contains any complex search operators (such as minus or parentheses), do not update the cookie. Once these checks have been made, count the characters (bytes in the case of double-byte language) in the search phrase and assign that value to X, count the number of characters of the category ID and assign that value Y and sum X and Y. If X+Y is greater than MAX_COOKIE_BYTE_COUNT, do not update the cookie. Else, update the cookie with the exact string of the query and the category ID.

This information may be sufficient to be able to make recommendations in the personalized web page. The MAX_COOKIE_BYTE_COUNT setting may be 40. This ensures that no more than 40 bytes are taken up in the cookie, while maximizing the likelihood of being able to surface high quality recommendations on the personalized web page. This proposed value may be vetted through the appropriate channels to gain agreement.

Add Related Searches to Personalized Web Page

A new module within the personalized web page may be created to display recommendations coming from the Related Searches system. The input for the Related Searches module may be the search phrase and the category constraint of the last search that the user ran. This "last search" may be from the current session or from a previous session. It may be available in the cookie. The output may be a list of recommendation links. The related searches widget may appear in the order of event recency, which is how the existing modules may already be ordered in production. The related searches widget may be titled "Related Searches".

If the Last Search Did not Include a Category Constraint:

The related searches widget may contain a subtitle of "Your last search was <X>. Here are some related searches."<X> represents the search phrase of the last search. <X> may be hyperlinked and clicking it may navigate the user to the search results page for that search phrase. The requirements for displaying the recommendation links within the new Related Searches widget are exactly the same as for DLPs (described earlier). A Personalized web page 1200 for searching without category constraint is illustrated in FIG. 12.

If the Last Search Did Contain a Category Constraint:

The related searches widget may contain a subtitle of "Your last search was <X>(in<Y>). <X> represents the search phrase of the last search. If the category constraint was a meta level category, <Y> is the meta category name. If the category constraint was an L2 category, <Y> is the meta category name followed by ">" followed by the L2 category name. If the category constraint was L3 or below, <Y> is the meta category name followed by ellipses ( . . . ) followed by ">" followed by the name of the category that was applied as a constraint.

The entire string "<X>(in <Y>)" is hyperlinked and may navigate to run a search with that same search phrase and that same category constraint. When there is a category constraint, the subheadings for Search Refinements and Search Alternatives may also be modified. The subheading for the Search Refinements portion may be "Search Refinements (in the same category)". The subheading for the Search Alternatives portion may be "Search Alternatives (in the same category)".

Figure 13:
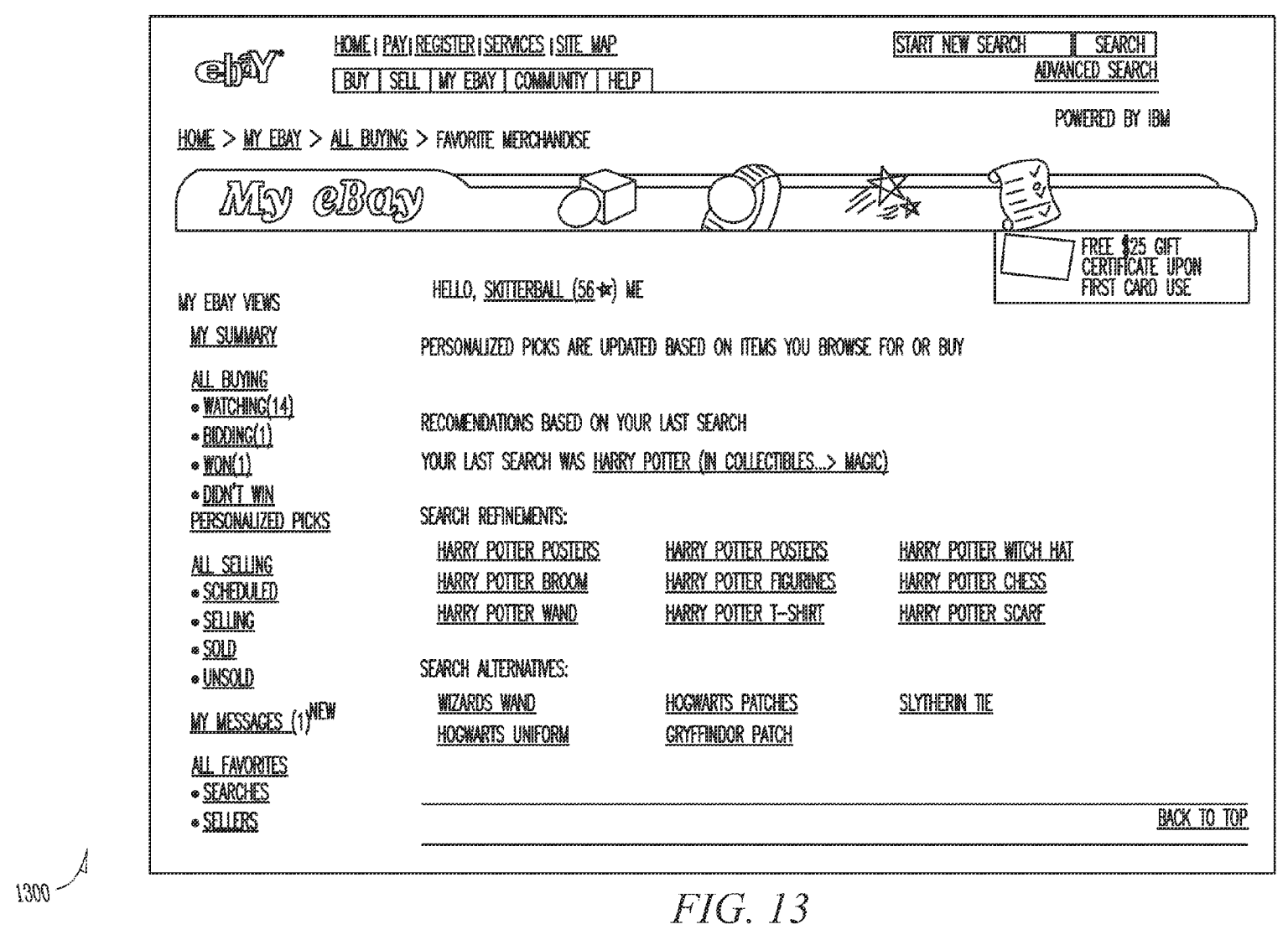

The actual search refinement and search alternative links may all navigate to a search where those keywords are used, but constrained to the same category as the last search (which the recommendations are based on) was constrained to. FIG. 13 illustrates a Personalized web page 1300 for searching with category constraint.

Click-Through and Bid-Through Tracking

Click-through tracking may be accomplished through ssPageNames as defined above. Bid-through tracking and click-through rates may be determined. A variable may be added to indicate whether the Searching page contains related searches recommendations or not and whether the user clicked on a related searches recommendation to arrive at the current page. The values for this new variable may be for example 00, 01, 10, or 11, based on the following rules. The first digit may be 0 if the user did not click on Related Searches to arrive at the current page. The first digit may be 1 if the user clicked on Related Searches to arrive at the current page. The second digit may be 0 if Related Searches recommendations are not being shown on the current page. The second digit may be 1 if Related Searches recommendations are being shown on the current page.

Terminology

The term "listing" or "item" is used to provide an example of data, and may refer to any data item, description, identifier, representation or information pertaining to a listing, service, offering or request. For example, a listing may be an auction or fixed-price offering (e.g., products such as goods and/or services), an advertisement, or a request for a listing or service. For the purposes of this specification, the word "term" is synonymous with the word "phrase" and is also intended to include a plurality of words. Thus, "term" or "phrase" can be used to refer to any entry (or entries) a user enters into a search field when requesting a search of a data system. The term "term-category pair" (or phrase-category pair) may refer to a search term or phrase associated with a particular data category.

Transaction Facility

Figure 14:
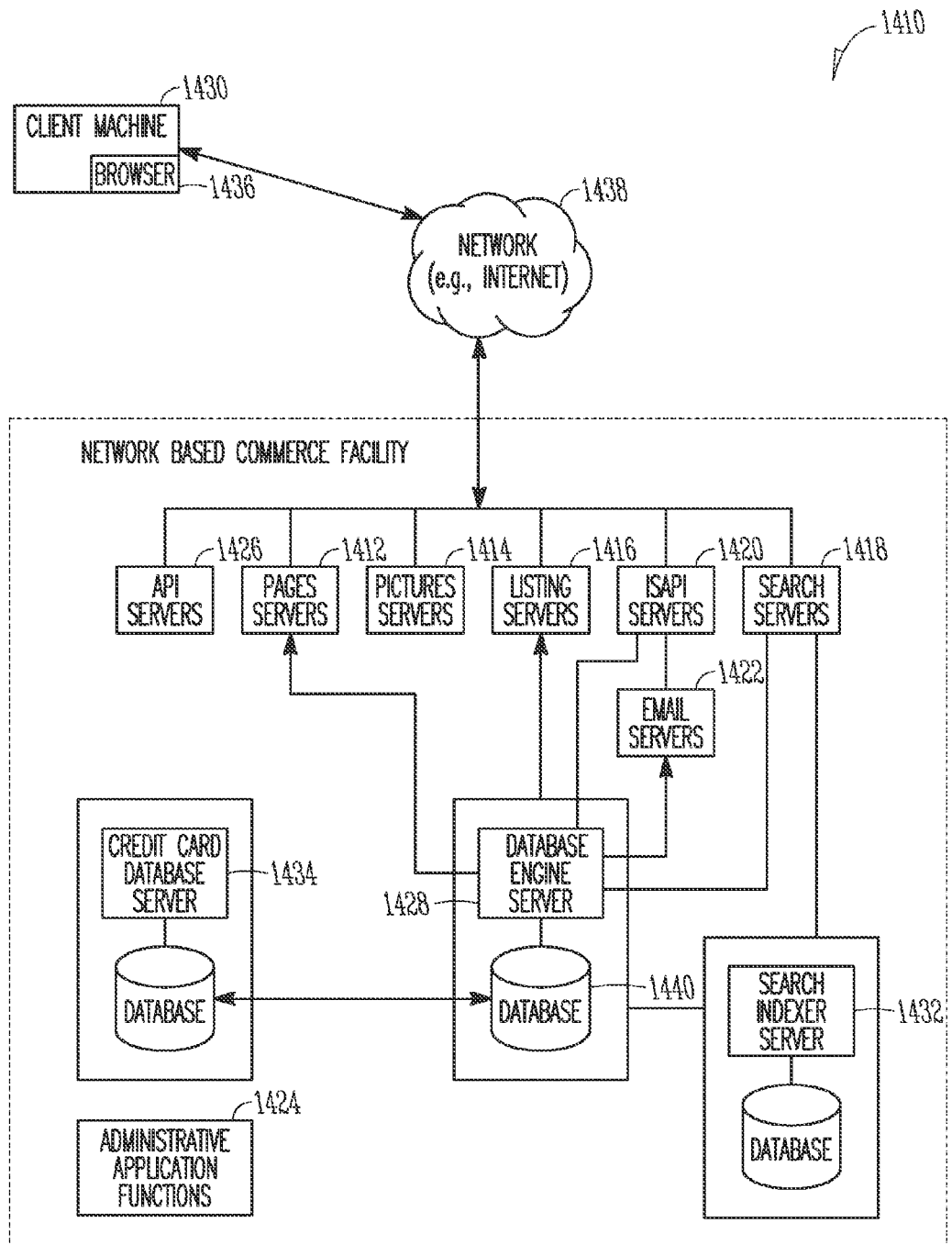
FIG. 14 is block diagram illustrating a network-based computer system.

FIG. 14 is block diagram illustrating a network-based computer system 1410, within which an example embodiment of the present invention may operate. While an exemplary embodiment of the present invention is described within the context of the network-based computer system 1410 for the purposes of illustration, the invention will find application in many different types of computer-based, and network-based, facilities and data processing systems.

The network-based computer system 1410, includes one or more of a number of types of front-end servers that each includes at least one Dynamic Link Library (DLL) to provide selected functionality. The system 1410 includes page servers 1412 that deliver web pages (e.g., mark-up language documents), picture servers 1414 that dynamically deliver images to be displayed within Web pages, listing servers 1416 that facilitate category-based browsing of listings, search servers 1418 that handle search requests to the system 1410 and facilitate keyword-based browsing of data, and ISAPI servers 1420 that provide an intelligent interface to a back-end of the system 1410. The system 1410 also includes e-mail servers 1422 that provide, inter alia, automated e-mail communications to users of the network-based computer system 1410. In one embodiment, one or more administrative application functions 1424 facilitate monitoring, maintaining, and managing the system 1410. One or more API servers 1426 may provide a set of API functions for querying and writing to the network-based computer system 1410. APIs may be called through the HTTP transport protocol. In one embodiment, information is sent and received using a standard XML data format. Applications utilized to interact (e.g., upload transaction listings, review transaction listings, manage transaction listings, etc.) with the network-based computer system 1410 may be designed to use the APIs. Such applications may be in an HTML form or be a CGI program written in C++, Perl, Pascal, or any other programming language. Exemplary APIs are more fully described in co-pending U.S. patent application Ser. No. 09/999,618, herein incorporated by reference.

The page servers 1412, API servers 1426, picture servers 1414, ISAPI servers 1420, search servers 1418, e-mail servers 1422 and a database engine server 1428 may individually, or in combination, act as a communication engine to facilitate communications between, for example, a client machine 1430 and the network-based computer system 1410. In addition, the page servers 1412, API servers 1426, picture servers 1414, ISAPI servers 1420, search servers 1418, e-mail servers 1422 and database engine server 1428 may individually, or in combination, act as a transaction engine to facilitate transactions between, for example, the client machine 1430 and the network-based computer system 1410. Furthermore, the page servers 1412, API servers 1426, picture servers 1414, ISAPI servers 1420, search servers 1418, e-mail servers 1422 and database engine server 1428 may individually, or in combination, act as a display engine to facilitate the display of listings on, for example, the client machine 1430.

The back-end servers may include the database engine server 1428, a search index server 1432 and a credit card database server 1434, each of which maintains and facilitates access to a respective database.

In one embodiment, the network-based computer system 1410 is accessed by a client program, such as for example a browser 1436 (e.g., the Internet Explorer distributed by Microsoft Corp. of Redmond, Wash.) that executes on the client machine 1430 and accesses the network-based computer system 1410 via a network such as, for example, the Internet 1438. Other examples of networks that a client may utilize to access the network-based computer system 1410 include a wide area network (WAN), a local area network (LAN), a wireless network (e.g., a cellular network), the Public Switched Telephone Network (PSTN) network, or the like. The client program that executes on the client machine 1430 may also communicate with the network-based computer system 1410 via the API servers 1426.

Database Structure

Figure 15:
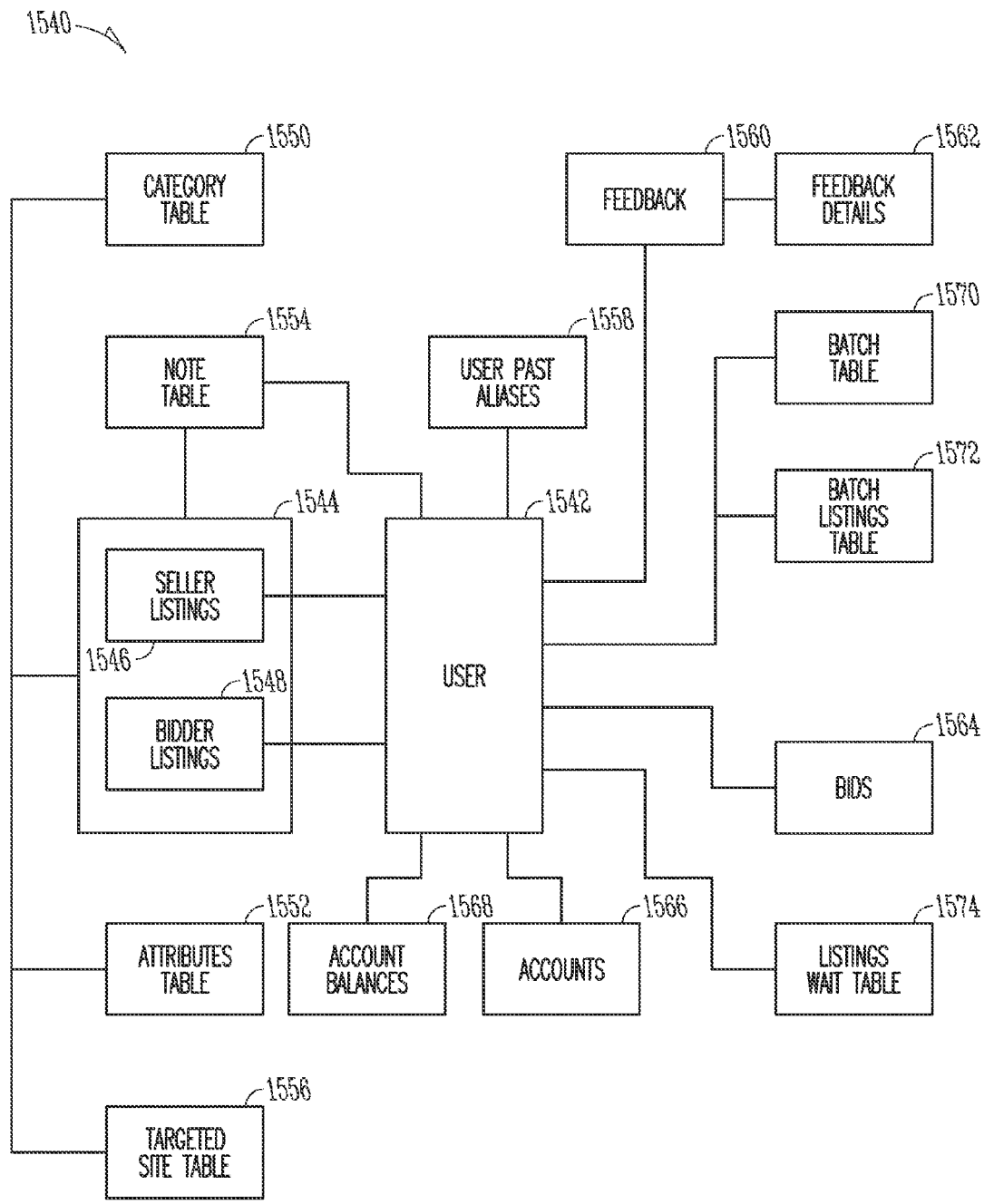
FIG. 15 is a database diagram illustrating an example database.

FIG. 15 is a database diagram illustrating an exemplary database 1540, maintained by and accessed via the database engine server 1428, which at least partially implements and supports the network-based computer system 1410. In one embodiment, the database engine server 1428 may maintain two databases, a first database being maintained for listing (or offering) information that is not included within a virtual "store", and a second database for listing (or offering) information that is presented via a virtual "store" supported by the network-based computer system 1410.

The database 1540 may, in one embodiment, be implemented as a relational database, and includes a number of tables having entries, or records, that are linked by indices and keys. In an alternative embodiment, the database 1540 may be implemented as collection of objects in an object-oriented database.

The database 1540 includes a user table 1542 that contains a record for each user of the network-based computer system 1410. A user may operate as a seller, a buyer, or both, when utilizing the network-based computer system 1410. The database 40 also includes listings tables 44 that may be linked to the user table 42. The listings tables 44 may include a seller listings table 46 and a bidder listings table 48. A user record in the user table 42 may be linked to multiple listings that are being, or have been, listed or offered for sale via the network-based computer system 10. In one embodiment, a link indicates whether the user is a seller or a bidder (or buyer) with respect to listings for which records exist within the listings tables 44.

The database 1540 also includes one or more divisions in the form of categories provided in category tables 1550. Each record within the category table 1550 may describe a respective category. In one embodiment, listings provided by the system 10 are arranged in the categories. These categories may be navigable by a user of the network-based computer system 1410 to locate listings in specific categories. Thus, categories provide a mechanism to locate listings that may be browsed. In addition or instead, an alphanumeric search mechanism may be provided by the search servers 1420 to allow a user to search for specific listings using search terms or phrases. In one embodiment, the category table 1550 describes multiple, hierarchical category data structures, and includes multiple category records, each of which describes the context of a particular category within the multiple hierarchical category structures. For example, the category table 1550 may describe a number of real, or actual, categories to which listing records, within the listings tables 1544, may be linked.

The database 1540 also includes one or more attributes tables 1552. Each record within the attributes table 1552 describes a respective attribute associated with a listing. In one embodiment, the attributes table 1552 describes multiple, hierarchical attribute data structures, and includes multiple attribute records, each of which describes the context of a particular attribute within the multiple hierarchical attribute structures. For example, the attributes table 1552 may describe a number of real, or actual, attributes to which listing records, within the listings tables 1544, may be linked. Also, the attributes table 1552 may describe a number of real, or actual, attributes to which categories, within the category table 1550, may be linked.

The database 1540 may also include a note table 1554 populated with note records that may be linked to one or more listing records within the listings tables 1544 and/or to one or more user records within the user table 1542. Each note record within the note table 1554 may include, inter alia, a comment, description, history or other information pertaining to a listing being offered via the network-based computer system 1410, to a user of the network-based computer system 1410. The database 1540 may also include a targeted site table 1556 populated with targeted site records that may be linked to one or more listing records within the listings tables 1544 and/or to one or more user records within the user table 1542.

A number of other example tables may also be linked to the user table 1542, namely a user past aliases table 1558, a feedback table 1560, a feedback details table 1562, a bids table 1564, an accounts table 1566, and an account balances table 1568. In one embodiment, the database 1540 also includes a batch table 1570, a batch listings table 1572, and a listings wait table 1574.

In one embodiment, the system 1410 generates search recommendations to a user of the system 1410. The search recommendations may be based on past user interaction of the particular user with the system 1410, and search terms used in the network-based computer system 1410 (or any other systems associated with the network-based computer system 1410).

Figure 16:
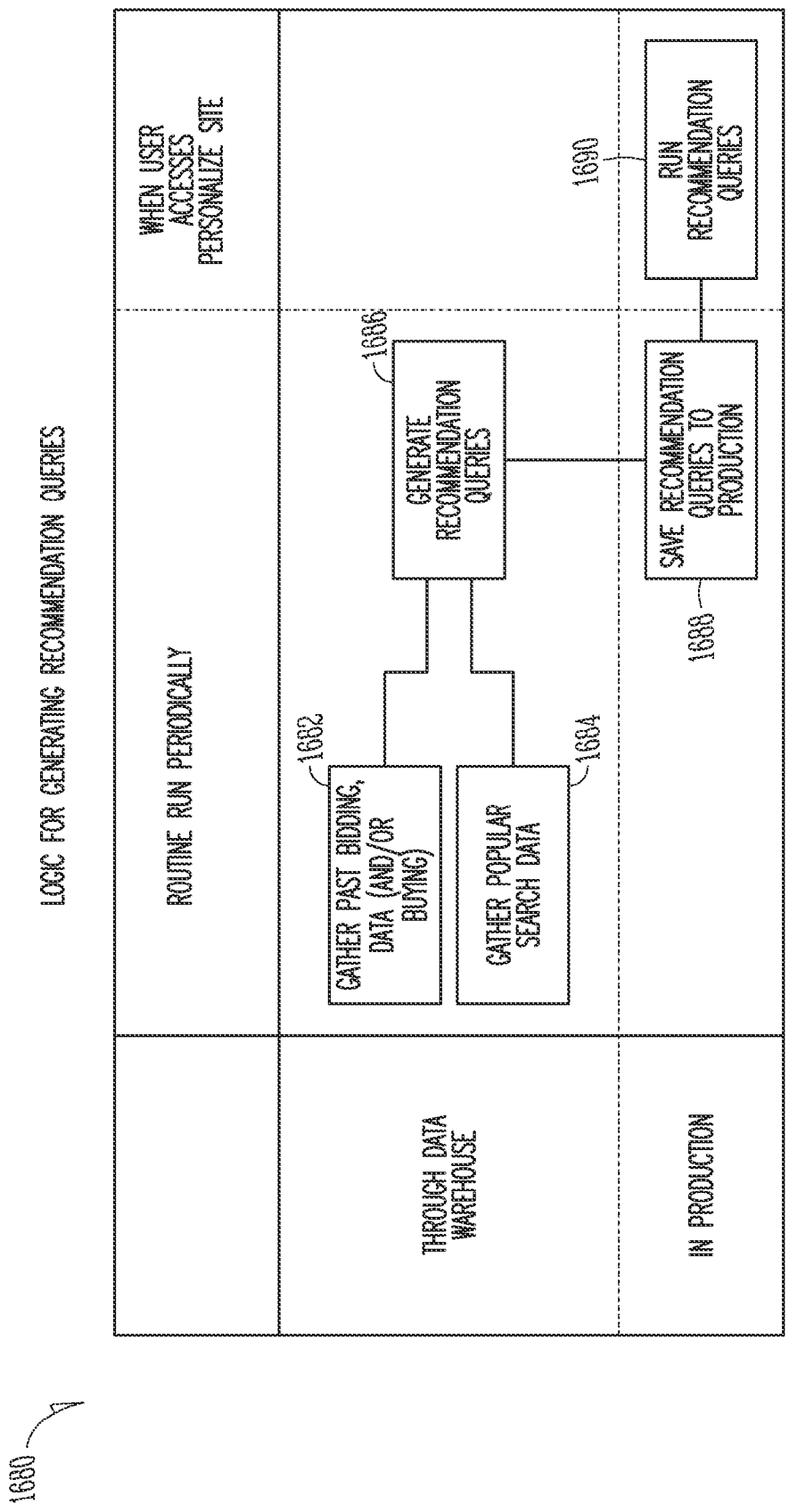
FIG. 16 illustrates example logic for generating recommendation queries based on past user interaction.

Referring to FIG. 16, reference numeral 1680 generally indicates example logic for generating recommendation queries based on past user interaction in the form of past bidding (and/or buying) history of the user, and the search terms. As shown at block 1682 past bidding (and/or buying) data of participating users is gathered at a data warehouse. In addition, popular search terms or phrases are gathered at block 1684 that, together with the past bidding (and/or buying) data is used to generate recommendation queries (see block 1686). Thus, the data warehouse may identify and store search terms that are used most frequently (popular search terms) across one or more predetermined number of sites (e.g., web sites) associated with the network-based computer system 1410, and also identify data uniquely associated with each user. As shown at block 1688, the popular search terms may then be passed periodically (e.g., on a daily basis) to a production facility, where the production facility may then project the popular search data against current listing inventory (see block 1690). In one embodiment, a search is conducted through each category, at each category level, using each popular search term. All popular search terms that match at least a predetermined number of listings (e.g., 50 listings), located in each particular category, may be stored along with total number of listings located in the particular category using the popular search term. Thus, each category may have a number of popular search terms or phrases (e.g., from 0 to a predetermined number) assigned to it along with a measurement of the popularity of the search term in that category. Thus, the system 10 allows a search to be conducted through current listings based on popular searches (based on interaction of all users) and unique historical interaction of a user.

Figure 17:
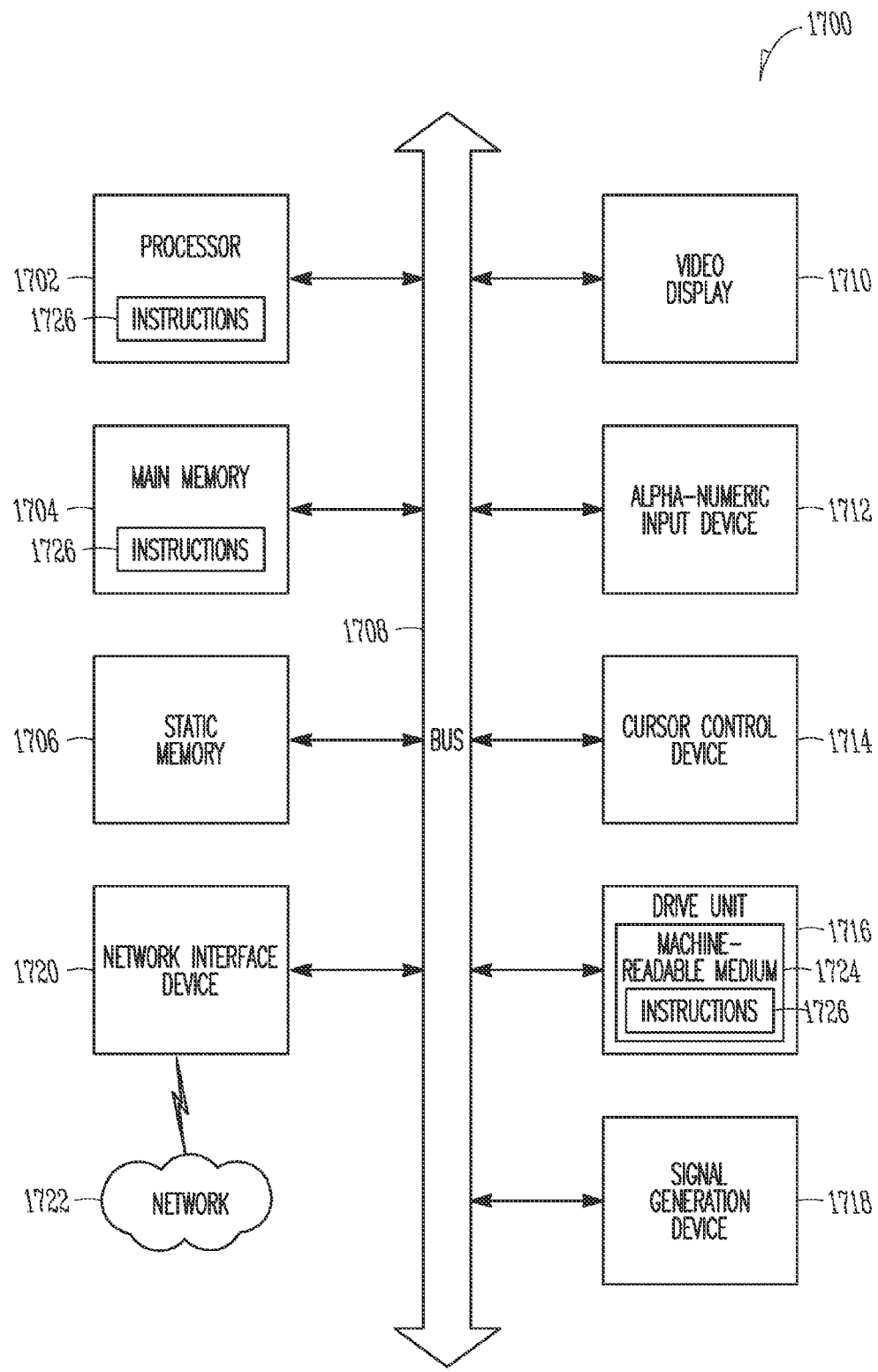
FIG. 17 shows a diagrammatic representation of a machine in the example form of a computer system.

FIG. 17 shows a diagrammatic representation of a machine in the example form of a computer system 1700 within which a set or sequence of instructions, for causing the machine to perform any one of the methodologies discussed herein, may be executed. In alternative embodiments, the machine may comprise a network router, a network switch, a network bridge, Personal Digital Assistant (PDA), a cellular telephone, a web appliance, set-top box (STB) or any machine capable of executing a sequence of instructions that specify actions to be taken by that machine.

The computer system 1700 includes a processor 1702, a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard), a cursor control device 1714 (e.g., a mouse), a disk drive unit 1716, a signal generation device 1718 (e.g., a speaker) and a network interface device 1720 to interface the computer system to a network 1722.

The disk drive unit 1716 includes a machine-readable medium 1724 on which is stored a set of instructions or software 1726 embodying any one, or all, of the methodologies described herein. The software 1726 is also shown to reside, completely or at least partially, within the main memory 1704 and/or within the processor 1702. The software 1726 may further be transmitted or received via the network interface device 1720. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks. Further, while the software is shown in FIG. 17 to reside within a single device, it will be appreciated that the software 1726 could be distributed across multiple machines or storage media, which may include the machine-readable medium.

Although the invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising: memory;
and a processor operatively coupled to the memory, wherein the processor is operable to run:
a search engine to execute a database search based upon a current user determined search query A; and
recommendation engine to analyze prior searches performed for other users to:
determine that one or more prior users that performed search query A, then performed search query B, and then performed predetermined post-search activity with respect to a result set returned by the search query B, wherein the search query' B comprises a search query that does not include an), terminology in common with the search query A; and
recommend the search query B to the current user,
wherein the recommendation engine is configured to determine whether the search query B includes a search operator and to refrain From recommending the search query B to the current user upon determination that the search query B includes the search operator, wherein the search operator comprises parentheses or Boolean operators; and
wherein the recommendation engine is configured to count a first number of characters of keywords in the search query B and a second number of characters of a category constraint for the search query B and to refrain from recommending the search query B to the current user based in determination that a sum of the first and second numbers exceeds a specified number.

2. The system of claim 1 wherein the recommendation engine analyzes a search query history of the other users and determines a success level in a predetermined activity of the other users.

3. The system of claim 2 wherein the predetermined activity is a commerce transaction.

4. The system of claim 3 wherein the commerce transaction is placing a bid in an auction.

5. The system of claim 1 wherein the recommendation engine determines a rank for one or more recommended searches based on post-search user or system behavior with respect to the database and the prior searches performed for the other users.

6. The system of claim 5 wherein the user behavior indicates that subsequent to each of the one or more recommended searches a threshold number of users purchased one or more products/services identified by the associated recommended search.

7. The system of claim 1 wherein the recommendation engine does not provide one or more recommended searches for the current user if the current user determined search query A includes an identified grammatical error.

8. The system of claim 1 wherein the current user determined search query A includes a product title, and the recommendation engine filters one or more recommended searches to avoid displaying recommendations that overlap with the product title.

9. The system of claim 1 wherein the post-search activity comprises purchasing one or more products/services identified by the search query B.

10. A computer-implemented method of making search recommendations comprising:
accessing a database;
determining a first number of prior users that performed a database search using search query A;
determining a second number as a subset of the first number of prior users that performed a database search using starch query B immediately subsequent to performing the database search using the search query A, and performed a predetermined post-search activity with respect to a result set returned by the search query B, wherein the starch query B comprises a search query that does not include any terminology in common with the search query A; and
recommending, upon determination that the second number is larger than zero, the search query B to a current user executing a database search using the search query A, wherein the recommending includes determining whether the search query B includes a search operator and refraining from recommending the search query B to the current user upon determination that the search query B includes the search operator, wherein the search operator comprises parentheses or Boolean operators,
and wherein the recommending includes counting a first number of characters of keywords in the search query B and a second number of characters of a category constraint for the search query B and refraining from recommending the search query B to the current user based on a determination that a sum of the first and second numbers exceeds a specified number.

11. The computer-implemented method of claim 10 wherein the predetermined post-search activity comprises purchasing one or more products/services.

12. A machine-readable medium including a set of instructions that, when executed by a machine, cause the machine perform the method of claim 10.

13. A computer-implemented method of managing a computerized commerce system where a user interface includes page views obtained during a session in response to user specified search queries, the method comprising:
   tracking session data to determine sequential page views, wherein page view B is viewed immediately after page view A and wherein post search user activity is done with respect to the page view B, wherein the page view A and the page view B are viewed as a result of search query A and search query B, respectively, wherein the search query B comprises a search query that does not include any terminology in common with the search query A;
   editing the tracked session data based upon search queries including a search phrase and a category constraint used to view the page views A and B, wherein the editing comprises eliminating the tracked session data if the category constraint of the search queries is not the same for both the page views A and B, or if the search phrase of the search queries is the same for both for page views A and B, wherein the editing comprises determining whether the search phrase includes a search operator and eliminating the tracked session data upon determination that the search phrase includes the search operator, wherein the search operator comprises parentheses or Boolean operators,
   and wherein the editing comprises counting a first number of characters of keywords in the search query B and a second number of characters of a category constraint for the search query B and refraining from recommending the search query B to the current user based on a determination that a sum of the first and second numbers exceeds a specified number; and
   maintaining a historical count of a number of times users viewed the page view A followed by the page view B based upon the edited tracked session data for use in recommending the search query B in response to receipt of the search query A from a current user.

14. The computer-implemented method of claim 13 wherein editing the tracked session data based upon a search phrase and a category constraint further comprises eliminating the tracked session data if the category constraint is on a prohibited list.

15. The computer-implemented method of claim 13 wherein tracking session data further comprises tracking predetermined post-search user activity with respect to the page view B.

16. The computer-implemented method of claim 15 wherein the predetermined post-search user activity comprises purchasing one or more products/services.

17. The computer-implemented method of claim 13 further comprises recommending a search query to view the page view B in response to a user specified search query resulting in viewing the page view A.

18. A computer-implemented method of managing a computerized commerce system having a user interface including page views obtained during a session in response to specified search queries, the method comprising:
   associating page views by prior users, wherein a first page view is associated with an immediately subsequent second page view based upon viewing frequency and post search user activity with respect to the second page view, wherein the first page view and the second page view are viewed as a result of search query A and search query B, respectively, wherein the search query B comprises a search query that does not include any terminology in common with the search query A;
   receiving from a current user a user specified search query producing a search result including the first page view; and
   recommending a system specified search query producing a search result including the second page view in response to receipt of the user specified search query, wherein the recommending includes determining whether the search query B includes a search operator and refraining from recommending the search query B to the current user upon determination that the search query B includes the search operator, wherein the search operator comprises parentheses or Boolean operators,
   and wherein the recommending includes counting a first number of characters of keywords in the search query B and a second number of characters of a category constraint for the search query B and refraining from recommending the search query B to the current user based on a determination that a sum of the first and second numbers exceeds a specified number.

19. The system of claim 1, wherein the recommendation engine is configured to refrain from updating a cookie upon determination that the sum of the first and second numbers exceeds the specified number.

20. The system of claim 1, wherein the recommendation engine is configured to:
   determine whether a category constraint is the same for both the search query A and the search query B; and
   refrain from recommending the search query B to the current user based on a determination that the category constraint is not the same for both the search query A and the search query B.

21. The computer-implemented method of claim 13, wherein the eliminating the tracked session data comprises eliminating sequential page views by the page view A followed by the page view B.

* * * * *

UNITED STATES PATENT AND TRADEMARK OFFICE
CERTIFICATE OF CORRECTION

| | | |
|---|---|---|
| PATENT NO. | : 8,200,687 B2 | Page 1 of 4 |
| APPLICATION NO. | : 11/323486 | |
| DATED | : June 12, 2012 | |
| INVENTOR(S) | : Raghav Gupta | |

It is certified that error appears in the above-identified patent and that said Letters Patent is hereby corrected as shown below:

On the title page 1, under "Other Publications", in column 2, line 15, after "0/689,970", insert --,--, therefor On the title page 2, under "Other Publications", in column 2, line 41, after "0/689,970", insert --,--, therefor On the title page 2, under "Other Publications", in column 2, line 39, after "0/689,970", insert --,--, therefor On the title page 2, under "Other Publications", in column 2, line 23, delete "John S," and insert --John S.,--, therefor On the title page 2, under "Other Publications", in column 2, line 31, delete "S," and insert --S.,--, therefor On the title page 3, under "Other Publications", in column 1, line 30, delete "L," and insert --L.,--, therefor On the title page 3, under "Other Publications", in column 1, line 34, delete "Y," and insert --Y.,--, therefor On the title page 3, under "Other Publications", in column 1, line 51, delete "H," and insert --H.,--, therefor On the title page 3, under "Other Publications", in column 1, line 54, delete "www-users", and insert --www.users--, therefor On the title page 3, under "Other Publications", in column 2, line 15, delete "N,", and insert --N.,--, therefor Signed and Sealed this
Fourth Day of November, 2014

Michelle K. Lee
*Deputy Director of the United States Patent and Trademark Office*

On the title page 3, under "Other Publications", in column 2, line 23, delete "D W,", and insert --D. W.,--, therefor On the title page 3, under "Other Publications", in column 2, line 37, delete "M,", and insert --M.,--, therefor On the title page 3, under "Other Publications", in column 2, line 40, delete "N,", and insert --N.,--, therefor On the title page 3, under "Other Publications", in column 2, line 53, delete "J,", and insert --J.,--, therefor On the title page 3, under "Other Publications", in column 2, line 58, delete "I,", and insert --I.,--, therefor On the title page 3, under "Other Publications", in column 2, line 66, delete "Customer?s", and insert --Customer's--, therefor On the title page 3, under "Other Publications", in column 2, line 68, delete "2000", and insert --(2000)--, therefor On the title page 3, under "Other Publications", in column 2, line 71, delete "2000", and insert --(2000)--, therefor On the title page 4, under "Other Publications", in column 1, line 4, delete "2000", and insert --(2000)--, therefor On the title page 4, under "Other Publications", in column 1, line 8, delete "C,", and insert --C.,--, therefor On the title page 4, under "Other Publications", in column 1, line 10, delete "2006262446 , mailed", and insert --2006262446, Examiner Report mailed--, therefor On the title page 4, under "Other Publications", in column 1, line 14, before "mailed" insert --Examiner's Answer--, therefor On the title page 4, under "Other Publications", in column 1, line 15, before "mailed" insert --to Examiner's Answer--, therefor On the title page 4, under "Other Publications", in column 1, line 18, delete "Mailed" and insert --mailed--, therefor On the title page 4, under "Other Publications", in column 1, line 36, after "2006262446," delete "Mailed" and insert --Examiner Report mailed--, therefor

CERTIFICATE OF CORRECTION (continued)
U.S. Pat. No. 8,200,687 B2

Figure 3:
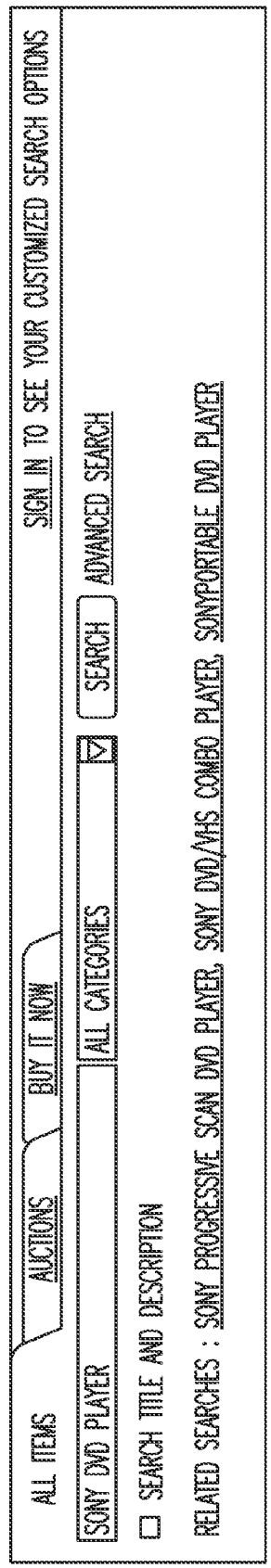

On the title page 4, under "Other Publications", in column 1, line 48, after "11/869290", insert --,--, therefor On the title page 4, under "Other Publications", in column 1, line 55, delete "Filed", and insert --filed--, therefor On the title page 4, under "Other Publications", in column 2, line 8, before "mailed" insert --Examiner Report--, therefor On the title page 4, under "Other Publications", in column 2, line 10, before "mailed" insert --to Examiner Report--, therefor On the title page 4, under "Other Publications", in column 2, line 17, after "Chinese Application Serial No.,", insert --200680022268.9--, therefor On the title page 4, under "Other Publications", in column 2, line 30, delete "Filed", and insert --filed--, therefor On the title page 4, under "Other Publications", in column 2, line 38, after "Office Action", insert --mailed--, therefor On the title page 4, under "Other Publications", in column 2, line 39, delete "Filed", and insert --filed--, therefor In the Drawings In sheet 2 of 16, figure 2, Block 190, delete "ARE" and insert --AND--, therefor In sheet 3 of 16, figure 3, Block 300, delete "Sonyportable" and insert --Sony Portable--, therefor In the Claims In column 15, line 46, in claim 1, delete "memory;" and insert --memory; and--, therefor In column 15, line 47, in claim 1, before "a processor", delete "and", therefor In column 15, line 51, in claim 1, before "recommendation", insert --a--, therefor In column 15, line 57, in claim 1, delete "query' B" and insert --query B--, therefor In column 15, line 58, in claim 1, delete "an)," and insert --any--, therefor In column 15, line 63, in claim 1, delete "From" and insert --from--, therefor CERTIFICATE OF CORRECTION (continued)
U.S. Pat. No. 8,200,687 B2

In column 16, line 6, in claim 1, delete "in" and insert --on a--, therefor

In column 16, line 8, in claim 2, after "claim 1", insert --,--, therefor

In column 16, line 12, in claim 3, after "claim 2", insert --,--, therefor

In column 16, line 14, in claim 4, after "claim 3", insert --,--, therefor

In column 16, line 16, in claim 5, after "claim 1", insert --,--, therefor

In column 16, line 21, in claim 6, after "claim 5", insert --,--, therefor

In column 16, line 26, in claim 7, after "claim 1", insert --,--, therefor

In column 16, line 30, in claim 8, after "claim 1", insert --,--, therefor

In column 16, line 35, in claim 9, after "claim 1", insert --,--, therefor

In column 16, line 45, in claim 10, delete "starch", insert --search--, therefor In column 16, line 49, in claim 10, delete "starch", insert --search--, therefor In column 16, line 60, in claim 10, delete "operators,", insert --operators, and--, therefor In column 16, line 61, in claim 10, delete "and wherein", insert --wherein--, therefor In column 17, line 1, in claim 11, after "claim 10", insert --,--, therefor In column 17, line 31, in claim 13, delete "operators,", insert --operators, and--, therefor In column 17, line 32, in claim 13, delete "and wherein", insert --wherein--, therefor In column 17, line 44, in claim 14, after "claim 13", insert --,--, therefor In column 17, line 49, in claim 15, after "claim 13", insert --,--, therefor In column 17, line 53, in claim 16, after "claim 15", insert --,--, therefor In column 18, line 1, in claim 17, after "claim 17", insert --,--, therefor In column 18, line 18, in claim 18, after "current user", insert --,--, therefor In column 18, line 29, in claim 18, delete "operators,", insert --operators, and--, therefor

UNITED STATES PATENT AND TRADEMARK OFFICE
CERTIFICATE OF CORRECTION

| | |
|---|---|
| PATENT NO. | : 8,200,687 B2 |
| APPLICATION NO. | : 11/323486 |
| DATED | : June 12, 2012 |
| INVENTOR(S) | : Raghav Gupta |

It is certified that error appears in the above-identified patent and that said Letters Patent is hereby corrected as shown below:

On the title page, in the illustrative figure, Block 190, delete "ARE" and insert --AND--.

On the title page 1, under "Other Publications", in column 2, line 15, after "0/689,970", insert --,--, therefor On the title page 2, under "Other Publications", in column 2, line 41, after "0/689,970", insert --,--, therefor On the title page 2, under "Other Publications", in column 2, line 39, after "0/689,970", insert --,--, therefor On the title page 2, under "Other Publications", in column 2, line 23, delete "John S," and insert --John S.,--, therefor On the title page 2, under "Other Publications", in column 2, line 31, delete "S," and insert --S.,--, therefor On the title page 3, under "Other Publications", in column 1, line 30, delete "L," and insert --L.,--, therefor On the title page 3, under "Other Publications", in column 1, line 34, delete "Y," and insert --Y.,--, therefor On the title page 3, under "Other Publications", in column 1, line 51, delete "H," and insert --H.,--, therefor This certificate supersedes the Certificate of Correction issued November 4, 2014.

Signed and Sealed this
Twenty-fifth Day of November, 2014

Michelle K. Lee
*Deputy Director of the United States Patent and Trademark Office*

On the title page 3, under "Other Publications", in column 1, line 54, delete "www-users", and insert --www.users--, therefor On the title page 3, under "Other Publications", in column 2, line 15, delete "N,", and insert --N.,--, therefor On the title page 3, under "Other Publications", in column 2, line 23, delete "D W,", and insert --D. W.,--, therefor On the title page 3, under "Other Publications", in column 2, line 37, delete "M,", and insert --M.,--, therefor On the title page 3, under "Other Publications", in column 2, line 40, delete "N,", and insert --N.,--, therefor On the title page 3, under "Other Publications", in column 2, line 53, delete "J,", and insert --J.,--, therefor On the title page 3, under "Other Publications", in column 2, line 58, delete "I,", and insert --I.,--, therefor On the title page 3, under "Other Publications", in column 2, line 66, delete "Customer?s", and insert --Customer's--, therefor On the title page 3, under "Other Publications", in column 2, line 68, delete "2000", and insert --(2000)--, therefor On the title page 3, under "Other Publications", in column 2, line 71, delete "2000", and insert --(2000)--, therefor On the title page 4, under "Other Publications", in column 1, line 4, delete "2000", and insert --(2000)--, therefor On the title page 4, under "Other Publications", in column 1, line 8, delete "C,", and insert --C.,--, therefor On the title page 4, under "Other Publications", in column 1, line 10, delete "2006262446 , mailed", and insert --2006262446, Examiner Report mailed--, therefor On the title page 4, under "Other Publications", in column 1, line 14, before "mailed" insert --Examiner's Answer--, therefor On the title page 4, under "Other Publications", in column 1, line 15, before "mailed" insert --to Examiner's Answer--, therefor On the title page 4, under "Other Publications", in column 1, line 18, delete "Mailed" and insert --mailed--, therefor On the title page 4, under "Other Publications", in column 1, line 36, after "2006262446," delete "Mailed" and insert --Examiner Report mailed--, therefor On the title page 4, under "Other Publications", in column 1, line 48, after "11/869290", insert --,--, therefor On the title page 4, under "Other Publications", in column 1, line 55, delete "Filed", and insert --filed--, therefor On the title page 4, under "Other Publications", in column 2, line 8, before "mailed" insert --Examiner Report--, therefor On the title page 4, under "Other Publications", in column 2, line 10, before "mailed" insert --to Examiner Report--, therefor On the title page 4, under "Other Publications", in column 2, line 17, after "Chinese Application Serial No.,", insert --200680022268.9--, therefor On the title page 4, under "Other Publications", in column 2, line 30, delete "Filed", and insert --filed--, therefor On the title page 4, under "Other Publications", in column 2, line 38, after "Office Action", insert --mailed--, therefor On the title page 4, under "Other Publications", in column 2, line 39, delete "Filed", and insert --filed--, therefor In the Drawings In sheet 2 of 16, figure 2, Block 190, delete "ARE" and insert --AND--, therefor In sheet 3 of 16, figure 3, Block 300, delete "Sonyportable" and insert --Sony Portable--, therefor In the Claims In column 15, line 46, in claim 1, delete "memory;" and insert --memory; and--, therefor In column 15, line 47, in claim 1, before "a processor", delete "and", therefor In column 15, line 51, in claim 1, before "recommendation", insert --a--, therefor

CERTIFICATE OF CORRECTION (continued)
U.S. Pat. No. 8,200,687 B2

In column 15, line 57, in claim 1, delete "query' B" and insert --query B--, therefor In column 15, line 58, in claim 1, delete "an)," and insert --any--, therefor In column 15, line 63, in claim 1, delete "From" and insert --from--, therefor In column 16, line 6, in claim 1, delete "in" and insert --on a--, therefor In column 16, line 8, in claim 2, after "claim 1", insert --,--, therefor In column 16, line 12, in claim 3, after "claim 2", insert --,--, therefor In column 16, line 14, in claim 4, after "claim 3", insert --,--, therefor In column 16, line 16, in claim 5, after "claim 1", insert --,--, therefor In column 16, line 21, in claim 6, after "claim 5", insert --,--, therefor In column 16, line 26, in claim 7, after "claim 1", insert --,--, therefor In column 16, line 30, in claim 8, after "claim 1", insert --,--, therefor In column 16, line 35, in claim 9, after "claim 1", insert --,--, therefor In column 16, line 45, in claim 10, delete "starch", insert --search--, therefor In column 16, line 49, in claim 10, delete "starch", insert --search--, therefor In column 16, line 60, in claim 10, delete "operators,", insert --operators, and--, therefor In column 16, line 61, in claim 10, delete "and wherein", insert --wherein--, therefor In column 17, line 1, in claim 11, after "claim 10", insert --,--, therefor In column 17, line 31, in claim 13, delete "operators,", insert --operators, and--, therefor In column 17, line 32, in claim 13, delete "and wherein", insert --wherein--, therefor In column 17, line 44, in claim 14, after "claim 13", insert --,--, therefor In column 17, line 49, in claim 15, after "claim 13", insert --,--, therefor In column 17, line 53, in claim 16, after "claim 15", insert --,--, therefor In column 18, line 1, in claim 17, after "claim 17", insert --,--, therefor

CERTIFICATE OF CORRECTION (continued)
U.S. Pat. No. 8,200,687 B2

In column 18, line 18, in claim 18, after "current user", insert --,-- , therefor In column 18, line 29, in claim 18, delete "operators,", insert --operators, and-- , therefor